United States Patent
Abotabl et al.

(10) Patent No.: US 12,309,817 B2
(45) Date of Patent: May 20, 2025

(54) PRE-EMPTION INDICATION FOR FULL DUPLEX COMMUNICATIONS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Alexandros Manolakos, Escondido, CA (US); Wanshi Chen, San Diego, CA (US); Hung Dinh Ly, San Diego, CA (US); Huilin Xu, Temecula, CA (US); Tingfang Ji, San Diego, CA (US); Shimman Arvind Patel, San Diego, CA (US); Krishna Kiran Mukkavilli, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 97 days.

(21) Appl. No.: 17/758,377

(22) PCT Filed: Feb. 1, 2021

(86) PCT No.: PCT/US2021/016067
§ 371 (c)(1),
(2) Date: Jul. 5, 2022

(87) PCT Pub. No.: WO2021/158480
PCT Pub. Date: Aug. 12, 2021

(65) Prior Publication Data
US 2023/0254885 A1    Aug. 10, 2023

(30) Foreign Application Priority Data
Feb. 4, 2020  (GR) ............................... 20200100057

(51) Int. Cl.
*H04W 72/541* (2023.01)
*H04L 5/14* (2006.01)
(Continued)

(52) U.S. Cl.
CPC ............. *H04W 72/541* (2023.01); *H04L 5/14* (2013.01); *H04W 72/0446* (2013.01); *H04W 72/232* (2023.01)

(58) Field of Classification Search
CPC ....... H04L 5/0042; H04L 5/0094; H04L 5/14; H04W 72/0446; H04W 72/23;
(Continued)

(56) References Cited

U.S. PATENT DOCUMENTS

2013/0039284 A1* 2/2013 Marinier ................. H04L 5/001
370/329
2018/0019843 A1* 1/2018 Papasakellariou .... H04L 1/1864
(Continued)

FOREIGN PATENT DOCUMENTS

CN    107925525 A    4/2018
CN    108809593 A    11/2018
(Continued)

OTHER PUBLICATIONS

International Search Report and Written Opinion—PCT/US2021/016067—ISA/EPO—Jul. 19, 2021.

*Primary Examiner* — Stephen J Clawson
(74) *Attorney, Agent, or Firm* — Holland & Hart LLP

(57) ABSTRACT

Methods, systems, and devices for wireless communications are described. A receiving device (such as a user equipment (UE)) may receive from a transmitting device (such as a base station), a configuration of full duplex communication resources for a set of slots. The receiving device may receive a pre-emption indication identifying that at least a portion of the full duplex communication resources in one or more (Continued)

slots of the set of slots is unavailable for communication, and may determine a remaining portion of the full duplex communication resources in the one or more slots based on the received pre-emption indication. The receiving device may then communicate with the transmitting device using the remaining portion of the full duplex communication resources.

30 Claims, 18 Drawing Sheets

(51) Int. Cl.
*H04W 72/0446* (2023.01)
*H04W 72/232* (2023.01)

(58) Field of Classification Search
CPC . H04W 72/232; H04W 72/541; H04W 72/54; H04W 72/231
See application file for complete search history.

(56) References Cited

U.S. PATENT DOCUMENTS

| | | | |
|---|---|---|---|
| 2018/0279325 A1* | 9/2018 | Huang | H04W 72/54 |
| 2019/0089499 A1 | 3/2019 | Nam et al. | |
| 2019/0098612 A1* | 3/2019 | Babaei | H04W 72/0446 |
| 2020/0236661 A1* | 7/2020 | Hassan Hussein | H04L 5/0044 |
| 2021/0258100 A1* | 8/2021 | Hassan Hussein | H04W 72/0453 |

FOREIGN PATENT DOCUMENTS

| | | |
|---|---|---|
| CN | 109804657 A | 5/2019 |
| EP | 3444987 A1 | 2/2019 |
| EP | 3547780 A1 | 10/2019 |

* cited by examiner

— Downlink Resources 405

— Uplink Resources 410

— Unavailable Resources 415

400

PRE-EMPTION INDICATION FOR FULL DUPLEX COMMUNICATIONS

CROSS REFERENCE

The present application is a 371 national stage filing of International PCT Application No. PCT/US2021/016067 by ABOTABL et al entitled "PRE-EMPTION INDICATION FOR FULL DUPLEX COMMUNICATIONS," filed Feb. 1, 2021; and claims priority to Greek Provisional Patent Application No. 20200100057 by ABOTABL, et al., entitled "PRE-EMPTION INDICATION FOR FULL DUPLEX COMMUNICATIONS," filed Feb. 4, 2020, each of which is assigned to the assignee hereof, and each of which is expressly incorporated by reference in its entirety herein.

BACKGROUND

The present disclosure relates generally to wireless communications, and more specifically to pre-emption indication for full duplex communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support UEs or base stations that are capable of full duplex communications (e.g., simultaneously transmitting and receiving). In some cases, full duplex wireless devices may be affected by interference from the device's own transmission and reception of signals, which may sometimes be referred to as self-interference. In particular, while a UE is receiving on a downlink, its antennas may be affected by interference from signals sent on an uplink by the same UE. Additionally, full duplex wireless devices may be affected by interference by downlink signals while transmitting an uplink signal. In other cases, a full duplex base station may transmit on the downlink to one or more UEs, which may contribute some level of interference to uplink signals received at the base station while it is transmitting. As such, improved techniques may be desirable to enhance communications efficiency in full duplex wireless devices.

SUMMARY

The described techniques relate to improved methods, systems, devices, and apparatuses that support pre-emption indication for full duplex communications. Generally, the described techniques provide for configuring full duplex communications such that resource usage is reduced or minimized. In some aspects, a user equipment (UE) may identify one or more radio frequency (RF) spectrum bands configured for full duplex communications. The UE may communicate with the base station based on one or more type(s) of full duplex communications supported by the UE. In some cases, the UE may receive a full duplex pre-emption indication indicating a downlink pre-emption indication or an uplink pre-emption indication or both. As an example, a base station may transmit, to the UE, a configuration of full duplex communication resources for the UE for a set of slots. To indicate the downlink pre-emption indication and the uplink pre-emption indication for a set of slots configured with full duplex communication resources, the base station may signal a full duplex pre-emption indication to the UE. According to one or more aspects, the UE may receive the full duplex pre-emption indication, and may identify downlink pre-emption resources as well as uplink cancellation resources based on the full duplex pre-emption indication. The UE may then determine a remaining portion of full duplex communication resources and may communicate with the base station using the remaining portion of full duplex communication resources.

A method for wireless communication at a user equipment (UE) is described. The method may include receiving, from a base station, a configuration of full duplex communication resources for the UE for a set of multiple slots, receiving, from the base station, a pre-emption indication identifying that at least a portion of the full duplex communication resources in one or more slots of the set of multiple slots is unavailable for communication with the UE, and communicating with the base station using a remaining portion of the full duplex communication resources in the one or more slots, the remaining portion based on the received pre-emption indication.

An apparatus for wireless communication at a UE is described. The apparatus may include a processor, memory in electronic communication with the processor, and instructions stored in the memory. The instructions may be executable by the processor to cause the apparatus to receive, from a base station, a configuration of full duplex communication resources for the UE for a set of multiple slots, receive, from the base station, a pre-emption indication identifying that at least a portion of the full duplex communication resources in one or more slots of the set of multiple slots is unavailable for communication with the UE, and communicate with the base station using a remaining portion of the full duplex communication resources in the one or more slots, the remaining portion based on the received pre-emption indication.

Another apparatus for wireless communication at a UE is described. The apparatus may include means for receiving, from a base station, a configuration of full duplex communication resources for the UE for a set of multiple slots, means for receiving, from the base station, a pre-emption indication identifying that at least a portion of the full duplex communication resources in one or more slots of the set of multiple slots is unavailable for communication with the UE, and means for communicating with the base station using a remaining portion of the full duplex communication resources in the one or more slots, the remaining portion based on the received pre-emption indication.

A non-transitory computer-readable medium storing code for wireless communication at a UE is described. The code may include instructions executable by a processor to receive, from a base station, a configuration of full duplex communication resources for the UE for a set of multiple slots, receive, from the base station, a pre-emption indication identifying that at least a portion of the full duplex communication resources in one or more slots of the set of multiple slots is unavailable for communication with the UE, and communicate with the base station using a remaining portion of the full duplex communication resources in the one or more slots, the remaining portion based on the received pre-emption indication.

Some examples of the method, apparatuses, and non-transitory computer-readable medium described herein may further include operations, features, means, or instructions for determining that the received pre-emption indication identifies that at least a portion of downlink communication resources and at least a portion of uplink communication resources in the one or more slots may be unavailable for communication with the UE, where the received pre-emption indication includes a downlink pre-emption indication or an uplink pre-emption indication.

Some examples of the method, apparatuses, and non-transitory computer-readable medium described herein may further include operations, features, means, or instructions for determining that the received pre-emption indication includes a first indication and a second indication, the first indication identifying that at least a portion of downlink communication resources in the one or more slots may be unavailable for communication with the UE, and the second indication identifying that at least a portion of uplink communication resources in the one or more slots may be unavailable for communication with the UE, where determining the remaining portion of the full duplex communication resources may be based on the first indication and the second indication.

In some examples of the method, apparatuses, and non-transitory computer-readable medium described herein, receiving the pre-emption indication may include operations, features, means, or instructions for receiving the first indication and the second indication via a downlink control information message.

Some examples of the method, apparatuses, and non-transitory computer-readable medium described herein may further include operations, features, means, or instructions for receiving a downlink control information message from the base station and determining that the portion of the full duplex communication resources in the one or more slots includes downlink communication resources based on the received downlink control information message.

Some examples of the method, apparatuses, and non-transitory computer-readable medium described herein may further include operations, features, means, or instructions for receiving a downlink control information message from the base station and determining that the portion of the full duplex communication resources in the one or more slots includes uplink communication resources based on the received downlink control information message.

Some examples of the method, apparatuses, and non-transitory computer-readable medium described herein may further include operations, features, means, or instructions for determining the remaining portion of the full duplex communication resources may be further based on determining that the portion of the full duplex communication resources in the one or more slots includes uplink communication resources or downlink communication resources, or both.

In some examples of the method, apparatuses, and non-transitory computer-readable medium described herein, receiving the pre-emption indication may include operations, features, means, or instructions for receiving, from the base station, a downlink control information message indicating at least one of a first set of resources, a second set of resources, a third set of resources, or a combination thereof.

In some examples of the method, apparatuses, and non-transitory computer-readable medium described herein, the first set of resources includes uplink communication resources, the second set of resources includes downlink communication resources, and the third set of resources includes resources common to uplink communication and downlink communication, and determining the remaining portion of the full duplex communication resources may be based on the first set of resources, the second set of resources, and the third set of resources.

Some examples of the method, apparatuses, and non-transitory computer-readable medium described herein may further include operations, features, means, or instructions for determining that a first subset of the portion of the full duplex communication resources in the one or more slots includes downlink communication resources based on the received pre-emption indication and determining that a second subset of the portion of the full duplex communication resources in the one or more slots includes uplink communication resources based on the received pre-emption indication.

Some examples of the method, apparatuses, and non-transitory computer-readable medium described herein may further include operations, features, means, or instructions for determining that the pre-emption indication may be absent based on determining that the set of multiple slots may be less than a threshold number of slots.

Some examples of the method, apparatuses, and non-transitory computer-readable medium described herein may further include operations, features, means, or instructions for receiving, from the base station, one of a downlink pre-emption indication or an uplink pre-emption indication, the downlink pre-emption indication identifying that a portion of downlink communication resources in the one or more slots may be unavailable for communication with the UE, and the uplink pre-emption indication identifying that a portion of uplink communication resources in the one or more slots may be unavailable for communication with the UE and determining the remaining portion of the full duplex communication resources in the one or more slots based on the received pre-emption indication and the one of the downlink pre-emption indication or the uplink pre-emption indication.

Some examples of the method, apparatuses, and non-transitory computer-readable medium described herein may further include operations, features, means, or instructions for receiving, from the base station, one of a downlink pre-emption indication or an uplink pre-emption indication, the downlink pre-emption indication identifying that a portion of downlink communication resources in the one or more slots may be unavailable for communication with the UE, and the uplink pre-emption indication identifying that a portion of uplink communication resources in the one or more slots may be unavailable for communication with the UE and assuming that the downlink pre-emption indication may be absent based on the received pre-emption indication and the one of the downlink pre-emption indication or the uplink pre-emption indication.

In some examples of the method, apparatuses, and non-transitory computer-readable medium described herein, a periodicity of the pre-emption indication corresponds to a periodicity of the set of multiple slots. In some examples of the method, apparatuses, and non-transitory computer-readable medium described herein, the pre-emption indication may be included in at least a sequence, a physical downlink control channel, or a combination thereof.

In some examples of the method, apparatuses, and non-transitory computer-readable medium described herein, the portion of the full duplex communication resources in the one or more slots may be indicated via at least one of a bitmap, a start indicator, a length indicator, or a combination thereof. In some examples of the method, apparatuses, and non-transitory computer-readable medium described herein, a difference between a timing associated with receiving the pre-emption indication and a timing associated with uplink communication resources included in the portion of the full duplex communication resources in the one or more slots satisfies a threshold.

A method for wireless communication at a base station is described. The method may include transmitting, to a UE, a configuration of full duplex communication resources for the UE for a set of multiple slots, transmitting, to the UE, a pre-emption indication identifying that a portion of the full duplex communication resources in one or more slots is unavailable for communication with the UE, where a remaining portion of the full duplex communication resources in the one or more slots is available for communication with the UE, and communicating with the UE using the determined remaining portion of the full duplex communication resources in the one or more slots based on transmitting the pre-emption indication.

An apparatus for wireless communication at a base station is described. The apparatus may include a processor, memory in electronic communication with the processor, and instructions stored in the memory. The instructions may be executable by the processor to cause the apparatus to transmit, to a UE, a configuration of full duplex communication resources for the UE for a set of multiple slots, transmit, to the UE, a pre-emption indication identifying that a portion of the full duplex communication resources in one or more slots is unavailable for communication with the UE, where a remaining portion of the full duplex communication resources in the one or more slots is available for communication with the UE, and communicate with the UE using the determined remaining portion of the full duplex communication resources in the one or more slots based on transmitting the pre-emption indication.

Another apparatus for wireless communication at a base station is described. The apparatus may include means for transmitting, to a UE, a configuration of full duplex communication resources for the UE for a set of multiple slots, means for transmitting, to the UE, a pre-emption indication identifying that a portion of the full duplex communication resources in one or more slots is unavailable for communication with the UE, where a remaining portion of the full duplex communication resources in the one or more slots is available for communication with the UE, and means for communicating with the UE using the determined remaining portion of the full duplex communication resources in the one or more slots based on transmitting the pre-emption indication.

A non-transitory computer-readable medium storing code for wireless communication at a base station is described. The code may include instructions executable by a processor to transmit, to a UE, a configuration of full duplex communication resources for the UE for a set of multiple slots, transmit, to the UE, a pre-emption indication identifying that a portion of the full duplex communication resources in one or more slots is unavailable for communication with the UE, where a remaining portion of the full duplex communication resources in the one or more slots is available for communication with the UE, and communicate with the UE using the determined remaining portion of the full duplex communication resources in the one or more slots based on transmitting the pre-emption indication.

In some examples of the method, apparatuses, and non-transitory computer-readable medium described herein, transmitting the pre-emption indication may include operations, features, means, or instructions for transmitting a first indication identifying that at least a portion of downlink communication resources in the one or more slots may be unavailable for communication with the UE and transmitting a second indication identifying that at least a portion of uplink communication resources in the one or more slots may be unavailable for communication with the UE, where the remaining portion of the full duplex communication resources may be based on the first indication and the second indication.

In some examples of the method, apparatuses, and non-transitory computer-readable medium described herein, transmitting the pre-emption indication may include operations, features, means, or instructions for transmitting the first indication and the second indication via a downlink control information message. Some examples of the method, apparatuses, and non-transitory computer-readable medium described herein may further include operations, features, means, or instructions for determining that the portion of the full duplex communication resources in the one or more slots includes downlink communication resources and transmitting, to a UE, a downlink control information message identifying the downlink communication resources.

Some examples of the method, apparatuses, and non-transitory computer-readable medium described herein may further include operations, features, means, or instructions for determining that the portion of the full duplex communication resources in the one or more slots includes uplink communication resources and transmitting, to a UE, a downlink control information message identifying the uplink communication resources.

In some examples of the method, apparatuses, and non-transitory computer-readable medium described herein, transmitting the pre-emption information may include operations, features, means, or instructions for determining that a first set of resources includes uplink communication resources, a second set of resources includes downlink communication resources, and a third set of resources includes resources common to uplink communication and downlink communication, where the remaining portion of the full duplex communication resources may be based on the first set of resources, the second set of resources and the third set of resources and transmitting a downlink control information message indicating at least one of the first set of resources, the second set of resources, the third set of resources, or a combination thereof.

DETAILED DESCRIPTION

Figure 1:
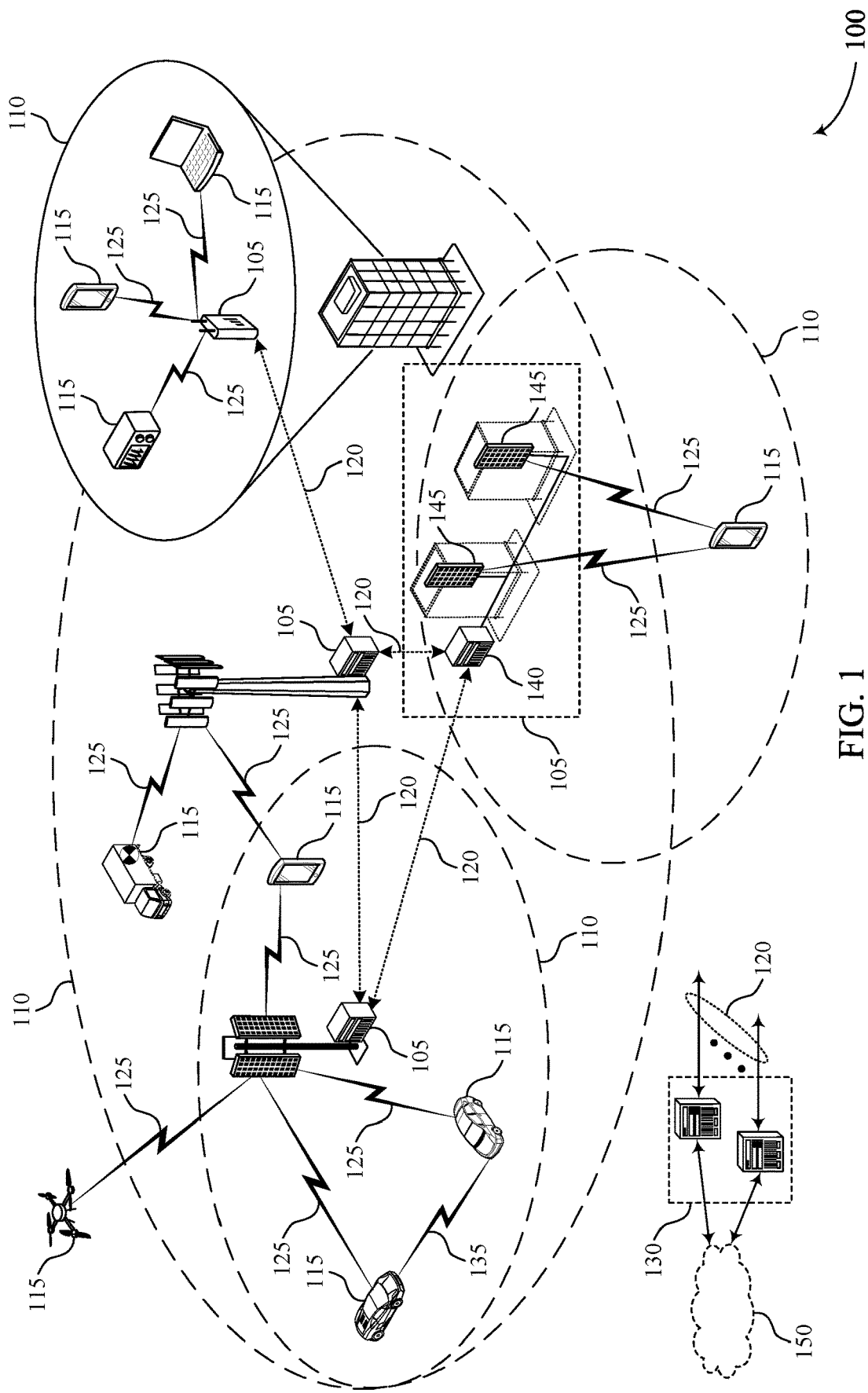
FIG. 1 illustrates an example of a system for wireless communications that supports pre-emption indication for full duplex communications in accordance with aspects of the present disclosure.

Some wireless communications systems may support full duplex communications by various wireless devices in the system. For example, both user equipment (UEs) and base stations may be capable of simultaneous transmission and reception. As such, radio frequency spectrum bands may be configured to support full duplex communications. For example, radio frequency spectrum bands that are configured, for example, for time division duplexing (TDD) operation, may be configured for full duplex operation. In addition, different types of full duplex communications may be associated with respective resource configurations, which may include uplink and downlink resources that overlap in both the time domain and frequency domain (e.g., in-band full duplex) or uplink and downlink resources that overlap in the time domain, but are separated in the frequency domain by a guard band (e.g., sub-band full duplex). Wireless devices that support full duplex may use one or more of these types of full duplex communications and corresponding resource configurations.

In some cases, wireless devices that support full duplex communications may be affected by self-interference caused by signal leakage between transmit and receive antenna arrays. For example, a UE that supports full duplex communications may experience interference on its receive antennas from its own uplink transmissions (e.g., while simultaneously transmitting in the uplink and receiving in the downlink). Additionally or alternatively, a base station may configure a UE with full duplex communication resources for a set of slots. The base station may then determine that one or more resources are unavailable for communication by the UE. In some wireless communications systems, the base station may transmit a downlink pre-emption indication to indicate to the UE some resources where downlink transmission is absent (e.g., canceled by the base station after configuring the UE with downlink communication resources). Similarly, the base station may transmit an uplink pre-emption indication to indicate to the UE some resources where an uplink resource have been canceled by the base station.

Generally, the downlink pre-emption indication and the uplink pre-emption indication are transmitted via separate downlink control information messages, and may include more resources. As described herein, a full duplex UE may support simultaneous downlink and uplink communication, and may be configured with overlapping (complete or partial) uplink communication resources and downlink communication resources. Thus, to reduce the amount of resources in signaling, there is a need for a common pre-emption indication for a full duplex UE, such that the downlink pre-emption indication and the uplink pre-emption indication, there exists a need for a common pre-emption indication.

As described herein, various techniques and configurations may enhance full duplex communications in a network, further reduce the amount of resources and increase efficiency of the UE. As an example, the base station may transmit, to the UE, a configuration of full duplex communication resources for the UE for a set of slots. To indicate the downlink pre-emption indication and the uplink pre-emption indication for a set of slots configured with full duplex communication resources, the base station may signal (e.g., via a downlink control information message or a sequence) a full duplex pre-emption indication to the UE. According to one or more aspects of the present disclosure, the UE may receive the full duplex pre-emption indication, and may identify downlink pre-emption resources as well as uplink cancellation resources based on the full duplex pre-emption indication. The UE may then determine a remaining portion of full duplex communication resources and may communicate with the base station using the remaining portion.

Features of the subject matter described herein may be implemented to realize one or more advantages. The described techniques may generally support improvements in full duplex communications, in addition to enhancements in reliability and interference cancellation, among other advantages. As such, the supported techniques may include improved network operations and, in some examples, may promote network efficiencies, improve spectrum efficiency, and enable low-latency reliable communication, among other benefits.

Aspects of the disclosure are initially described in the context of a wireless communications system. Aspects of the disclosure are further described in the context of resource configurations and a process flow. Aspects of the disclosure are further illustrated by and described with reference to apparatus diagrams, system diagrams, and flowcharts that relate to pre-emption indication for full duplex communications.

FIG. 1 illustrates an example of a wireless communications system 100 that supports pre-emption indication for full duplex communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some examples, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). In some examples, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at one or more orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A medium access control (MAC) layer may perform priority handling and multiplexing of logical channels into transport channels. The MAC layer may also use error detection techniques, error correction techniques, or both to support retransmissions at the MAC layer to improve link efficiency. In the control plane, the radio resource control protocol layer may provide establishment, configuration, and maintenance of the radio resource control connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Existing wireless communications systems may not provide for the use of a common pre-emption indication for full duplex communications. For instance, in existing wireless communications systems, a downlink pre-emption indication may be defined to indicate some resources where downlink transmission is absent (e.g., previously configured, by the base station but later canceled by the base station after configuring the UE). Similarly, an uplink pre-emption indication is defined to indicate some resources where an uplink resources have been previously configured by the base station, but subsequently canceled by the base station. Some wireless communications systems generally provide for transmission of the downlink pre-emption indication and the uplink pre-emption indication via separate indications (such as via separate downlink control information message) and may use more resources. A UE supporting full duplex communication may support simultaneous downlink and uplink communication (e.g., in parallel on downlink and uplink). A full duplex UE may be configured with overlapping (complete or partial) uplink communication resources and downlink communication resources. However, separately providing the downlink pre-emption indication and the uplink pre-emption indication may be time-intensive, may result in a high overhead signaling cost, and may use a large amount of computational processing resources.

One or more aspects of the present disclosure provides for a common pre-emption indication (e.g., a full duplex pre-emption indication) for a full duplex UE, such that the common pre-emption indication uses less resources and increases efficiency of the UE. In some examples, a base station 105 may transmit a configuration of full duplex communication resources for a UE 115 for a set of slots. The UE 115 may identify the full duplex communication resources based on receiving the configuration. The UE 115 may then receive a pre-emption indication from the base station 105. The pre-emption indication may identify that at least a portion of the full duplex communication resources in one or more slots of the set of slots is unavailable for communication with the UE 115. Based on the pre-emption indication, the UE 115 may determine a remaining portion of the full duplex communication resources in the one or more slots and may communicate with the base station 105 using the remaining portion of the full duplex communication resources. Thus, providing a common pre-emption indication, as described herein, may result in improved throughput, increased system efficiency, and improved user experience.

Figure 2:
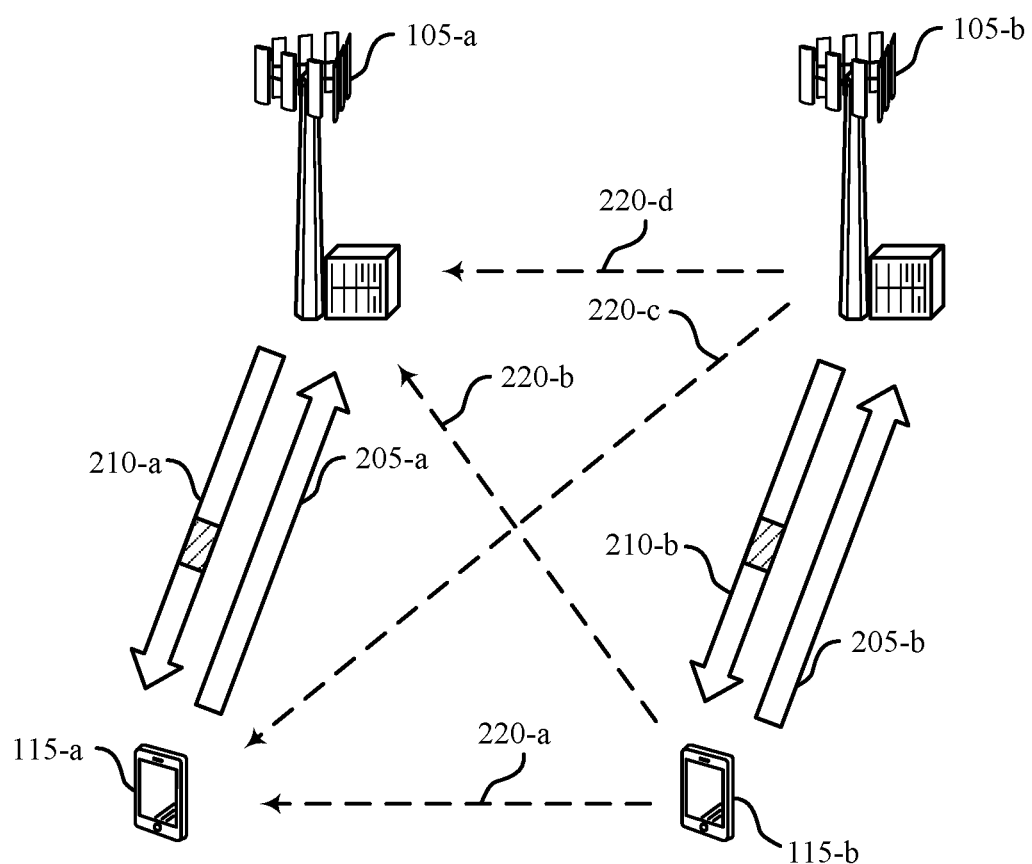
FIG. 2 illustrates an example of a wireless communications system that supports pre-emption indication for full duplex communications in accordance with aspects of the present disclosure.

FIG. 2 illustrates an example of a wireless communications system 200 that supports pre-emption indication for full duplex communications in accordance with aspects of the present disclosure. In some examples, the wireless communications system 200 may implement aspects of wireless communications system 100. The wireless communications system 200 may include a UE 115-a, a UE 115-b, a base station 105-a, and a base station 105-b, which may be examples of the corresponding devices described with reference to FIG. 1. In some cases, the wireless communications system 200 (e.g., a 5G or an NR system) may support enhancements for full duplex communications at both ends of a communication link (e.g., for both a UE 115 and a base station 105).

In some cases, the UE 115-a and the base station 105-a may support full duplex communications over uplink communication link 205. While transmitting and receiving signals using full duplex communications, the UE 115-a or the base station 105-a, or both, may experience self-interference due to transmitting and receiving signals. In some examples, the UE 115-a or the base station 105-a, or both, may experience self-interference due to communicating using spatially proximate antenna arrays. For instance, the UE 115-a may transmit a signal to the base station 105-a on uplink communication link 205-a via a transmit antenna array while simultaneously receiving a signal from the base station 105-a on downlink communication link 210-a via a receive antenna array. In cases when the transmit antenna array is spatially proximate to the receive antenna array, the UE 115-a may experience interference at the receive antenna array from transmissions via the transmit antenna array. In particular, the UE 115-a may experience interference on its receive antennas from its own uplink transmissions (e.g., while simultaneously transmitting in the uplink and receiving in the downlink).

In some examples, the UE 115-a may experience cross-link interference from the uplink transmissions of a nearby or neighboring UE 115 (e.g., uplink transmissions by UE 115-b over uplink communication link 205-b may cause interfering signals (such as over communication link 220-a)). In some examples, the UE 115-a may experience cross-link interference over communication link 220-c and the base station 105-a may experience cross-link interference over communication link 220-b. The base station 105-a may experience self-interference for similar reasons. For instance, the base station 105-a may experience self-interference when receiving uplink communications from one or more UEs 115 (e.g., including UEs 115-a and 115-b) while simultaneously communicating on the downlink to the UE 115-a, where the downlink signaling may generate the self-interference on the reception on the uplink at base station 105-a. Additionally, the base station 105-a may experience cross-link interference from the base station 105-b (e.g., over communication link 220-d).

Additionally or alternatively, similar conditions may apply to the UE 115-b and the base station 105-b over downlink communication link 210 based on simultaneously communicating via uplink communication link 205-b and downlink communication link 210-b. In some examples, the UE 115-a may identify that the UE 115-a may support in-band full duplex or sub-band full duplex (e.g., flexible duplex), or both, over uplink communication link 205. A UE (such as UE 115-a and UE 115-b) and a base station (such as base station 105-a and base station 105-b) may support an in-band full duplex. In the in-band full duplex, the UE and the base station may transmit and receive signals on the same time and frequency resource. That is, in the in-band full duplex, the downlink and uplink shares the same in-band full duplex time or frequency resources. In some cases, the downlink and uplink resources may fully or partially overlap (e.g., be transmitted in the same frequency band) in the in-band full duplex mode.

Additionally or alternatively, a UE (such as UE 115-a and UE 115-b) and a base station (such as base station 105-a and base station 105-b) may support a sub-band flexible duplex. In the sub-band flexible duplex, the UE and the base station may transmit and receive at the same time but on the different frequency resources. For instance, in sub-band flexible duplex, the downlink resource may be separated from the uplink resource in the frequency domain. The downlink and uplink may be transmitted in different frequency bands and a guard band may be located between the downlink resources and the uplink resources. In some examples, leakage of signal between the downlink and uplink in sub-band flexible duplex mode may result in self-interference in a UE (such as UE 115-a and UE 115-b). In some examples, the UE 115-a may identify the one or more types of full duplex communications that may be supported by the UE 115-a on a per-frequency band basis. As such, the UE 115-a may identify, at each frequency band of the resources identified by the UE 115-a, one or more types of full duplex communications that may be supported by the UE 115-a. In one illustrative example, the UE 115-a may identify that it supports in-band full duplex on a first number of frequency bands, sub-band full duplex on a second number of frequency bands, and both in-band and sub-band full duplex on a third number of frequency bands.

In wireless communications systems supporting NR, a downlink pre-emption indication may be defined to indicate to the UE (such as UE 115-a and UE 115-b) some resources where downlink transmission is absent (e.g., canceled by the base station after configuring the UE). That is, the downlink pre-emption indication may be defined to indicate to the UE some resources, where the UE does not consider any downlink transmission. In one example, the downlink pre-emption indication may be indicated via physical downlink control channel (as part of a downlink control information message). In some wireless communications systems, a UE (such as UE 115-a and UE 115-b) may receive downlink pre-emption indication by periodically monitoring a radio network temporary identifier. Similarly, an uplink pre-emption indication may be defined to indicate to the UE (such as UE 115-a and UE 115-b) some resources where an uplink resources have been canceled by the base station (such as base station 105-a and base station 105-b). In some examples, there may be different priorities assigned to different UEs. If a higher priority UE needs resources, then the base station may cancel low priority resources to serve the high priority resources. The downlink pre-emption indication and the uplink pre-emption indication may be effectively user for inter-UE interference management. That is, the downlink pre-emption indication and the uplink pre-emption indication may provide a high reliability in communication between the UEs and base stations.

In some wireless communications systems, the downlink pre-emption indication and the uplink pre-emption indication may be transmitted via separate downlink control information message and may thus use a large amount of resources. A full duplex UE may support simultaneous downlink and uplink communication and may thus be configured with overlapping (complete or partial) uplink communication resources and downlink communication resources. There is a need for a common pre-emption indication (e.g., a full duplex pre-emption indication) for a full duplex UE, such that the common pre-emption indication uses less resources and increases efficiency of the UE.

As described herein, the UE 115-*a*, the UE 115-*b*, the base station 105-*a* and the base station 105-*b* may implement methods that may provide for a common pre-emption indication during full duplex communications. Although examples are provided in the context of full duplex communications between the UE 115-*a* and the base station 105-*a* over uplink communication link 205, the techniques described are equally applicable to the UE 115-*b* and the base station 105-*b* over downlink communication link 210. Further, the techniques described herein are not limited to communications between a UE 115 and a base station 105 and may apply to any two communicating devices that may support full duplex communications.

According to one or more aspects of the present disclosure, a full duplex UE (such as UE 115-*a*) may interpret a downlink pre-emption indication as an uplink pre-emption based on the indicated resources. Similarly, the UE 115-*a* may interpret an uplink pre-emption indication as a downlink pre-emption based on the indicated resources. In some aspects of full duplex communications, downlink and uplink can use the same resources (e.g., time or frequency resources). In some examples, interpreting the downlink pre-emption indication as the uplink pre-emption and vice versa may reduce a self-interference at a UE 115-*a*. Additionally or alternatively, the base station 105-*a* may transmit the downlink pre-emption indication and/or the uplink pre-emption indication to reduce cross-link interference. In some examples, the UE 115-*a* may receive the downlink pre-emption indication and/or the uplink pre-emption indication may in full duplex slots and are interpreted in time division duplex slots.

To indicate downlink and uplink pre-emption indications for full duplex slots, the base station 105-*a* may signal (e.g., via a downlink control information message or a sequence) a full duplex pre-emption indication to the UE 115-*a*. According to one or more aspects, the UE 115-*a* may identify downlink pre-emption resources as well as uplink cancellation resources based on the full duplex pre-emption indication. The UE 115-*a* may then determine a remaining portion of full duplex communication resources. For example, in response to receiving the full duplex pre-emption indication, the UE 115-*a* may determine that the downlink resources indicated by the full duplex pre-emption indication is treated as a downlink pre-emption indication and the uplink resources is treated as an uplink pre-emption indication. The UE 115-*a* may then communicate using the remaining portion of full duplex communication resources.

According to one or more aspects, the base station 105-*a* may refrain from sending an additional downlink or uplink pre-emption indications (i.e., in addition to the full duplex pre-emption indication) in the set of slots configured for full duplex communication. In some examples, the base station 105-*a* may send the additional downlink or uplink pre-emption indications (such as for higher reliability, higher pre-emption resolution or more pre-emption resources).

Upon receiving the additional downlink or uplink pre-emption indications, the UE 115-*a* may identify the corresponding downlink or uplink resources unavailable for communication. Alternatively, upon receiving the additional downlink or uplink pre-emption indications, the UE 115-*a* may assume that the additional downlink or uplink pre-emption indications is absent.

Figure 3:
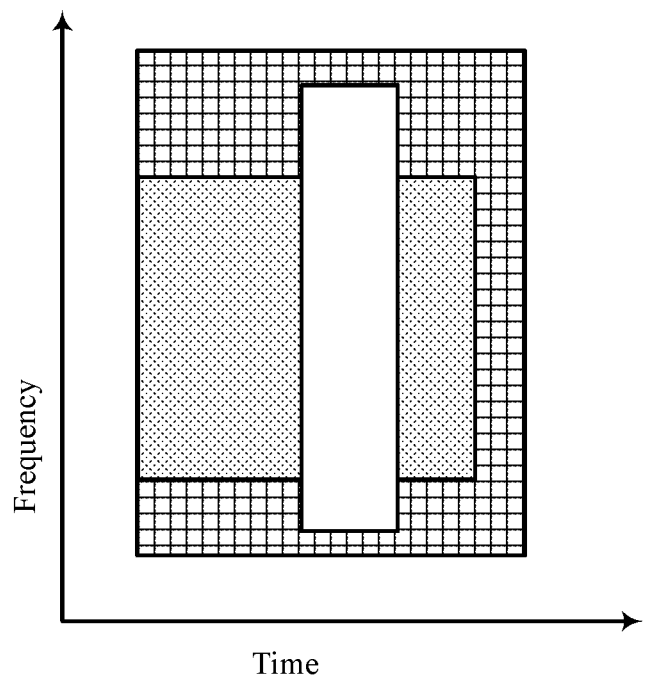
FIG. 3 illustrates an example of a resource configuration that supports pre-emption indication for full duplex communications in accordance with aspects of the present disclosure.

FIG. 3 illustrates an example of a resource configuration 300 that supports pre-emption indication for full duplex communications in accordance with aspects of the present disclosure. In some examples, the resource configuration 300 may implement aspects of the wireless communications systems 100 and the wireless communications systems 200. For example, the resource configuration 300 may be examples of the resource configurations configured (e.g., semi-statically for example by RRC signaling indicating a configuration, or dynamically for example by DCI signaling indicating a configuration) by a base station 105 (e.g., the base station 105-*a* described with reference to FIG. 2) according to the full duplex capability of a UE 115 (e.g., the UE 115-*a*, as described with reference to FIG. 2). In such examples, the resource configuration 300 may be an example of the resource configuration that the UE 115 and the base station 105 may use to support full duplex communications, which may support full duplex pre-emption indication to reduce or mitigate self-interference by one or more devices.

As described herein, the UE 115 and the base station 105 may support full duplex communications using one or more types of full duplex communications. For example, the UE 115 may identify one or more types of full duplex communications for each frequency band within resources identified by the UE 115. For instance, the UE 115 may identify resources for full duplex communications with the base station 105. One or more frequency bands may be included within the resources identified by the UE 115, and each frequency band may be associated with a type of full duplex communication that may be supported by the UE 115. In some examples, the base station 105 may configure a resource configuration, such as resource configuration 300, for the UE 115. The UE 115 and the base station 105 may simultaneously transmit and/or receive on uplink resources 310 and downlink resources 305 based on the resource configuration.

In some examples, the UE 115 may support in-band full duplex for the one or more frequency bands. The one or more frequency bands may include uplink resources 310 and downlink resources 305. Resource configuration 300 may illustrate that the UE 115 and the base station 105 communicate using fully overlapping resources for uplink resources 310 and downlink resources 305 (e.g., overlapping time and frequency resources are provided for both uplink resources 310 and downlink resources 305).

According to one or more aspects of the present disclosure, the base station 105 may transmit a full duplex pre-emption indication defined for full duplex UE. In one option, the full duplex pre-emption indication may include downlink pre-emption resources as well as uplink cancellation resources separately. In another option, the full duplex pre-emption indication may include downlink resources or uplink resources, and the base station may transmit another indication (e.g., downlink control information message) to identify whether the resources are downlink resources or uplink resources. In a third option, the full duplex pre-emption indication may include downlink resources, uplink resources as well as resources common to both downlink and uplink.

In some instances, the UE 115 may receive a configuration of full duplex communication resources for the UE 115 for a set of slots. As depicted in FIG. 3, the UE 115 may identify resources for uplink resources 310 and resources for downlink resources 305 based on the received configuration. The UE 115 may then receive a pre-emption indication (e.g., full duplex pre-emption indication) from the base station 105. The pre-emption indication may be included in at least a sequence, a physical downlink control channel, or a combination thereof. In some examples, a periodicity of the pre-emption indication corresponds to a periodicity of the plurality of slots. According to some aspects, the pre-emption indication may identify that at least a portion of the full duplex communication resources in one or more slots of the plurality of slots is unavailable for communication with the UE 115. In some examples, the UE 115 may determine a remaining portion of the full duplex communication resources in the one or more slots based on the received pre-emption indication. As depicted in the example of FIG. 3, the pre-emption indication may indicate that the unavailable resources 315 are unavailable for communication by the UE 115. In one example, the pre-emption indication may separately indicate uplink resources unavailable for communication within the resources for uplink resources 310 and downlink resources unavailable for communication within the resources for downlink resources 305. For example, the UE 115 may determine that the received pre-emption indication identifies that at least a portion of downlink communication resources and at least a portion of uplink communication resources in the one or more slots is unavailable for communication with the UE. In some cases, the received pre-emption indication comprises a downlink pre-emption indication or an uplink pre-emption indication (indicated via a downlink control information message).

Additionally or alternatively, the pre-emption indication may indicate some resources and the interpretation at the UE 115 may be either implicit or explicit. For instance, the UE 115 may determine that the received pre-emption indication includes a first indication and a second indication. The UE 115 may determine that the first indication identifies that at least a portion of downlink resources 305 in the one or more slots is unavailable for communication with the UE, and the second indication identifies that at least a portion of uplink resources 310 in the one or more slots is unavailable for communication with the UE. As described in the example of FIG. 3, the unavailable resources 315 may include at least the portion of downlink resources 305 and at least the portion of uplink resources 310. Upon transmitting the pre-emption indication, the base station 105 may transmit a second indication (e.g., a bit in a downlink control information message) indicating whether the resources indicated by the pre-emption indication includes downlink or uplink resources.

According to one or more aspects, the pre-emption indication may indicate unavailable downlink resources and unavailable uplink resources and resources common to both uplink and downlink. For instance, the UE 115 may receive the pre-emption indication indicating at least one of a first set of resources, a second set of resources, a third set of resources, or a combination thereof. In some examples, the first set of resources may include uplink communication resources, the second set of resources may include downlink communication resources, and the third set of resources may include resources common to uplink communication and downlink communication. As described in the example of FIG. 3, the unavailable resources 315 may include at least a portion of downlink resources 305, at least a portion of uplink resources 310, and at least a portion of resources common to both downlink resources 305 and uplink resources 310.

In some aspects, the pre-emption indication may indicate the unavailable resources 315, and the UE may interpret downlink pre-emption resources in the downlink bandwidth and uplink pre-emption resources in the uplink bandwidth. For example, upon identifying the unavailable resources 315, the UE 115 may determine a first subset of the portion of downlink resources 305 and a second subset of the portion of uplink resources 310. The first subset and the second subset may be overlapping or non-overlapping subsets. In some cases, a size of the downlink communication resources may correspond to a bandwidth part associated with downlink communication and a size of the uplink communication resources may correspond to a bandwidth part associated with uplink communication.

In some cases, a periodicity of the pre-emption indication may be associated with the periodicity of the full duplex slots. In some examples, if the UE 115 determines that a number of full duplex slots is less than a threshold number of slots (such as 1 slot), then the UE 115 can assume that the pre-emption indication is absent. Alternatively, if the UE 115 determines that the number of full duplex slots satisfies a threshold number of slots, then the UE 115 can periodically receive the pre-emption indication. In some examples, the format of the pre-emption indication may take different forms depending on a reliability as well as the detection complexity at the UE 115. In some examples, a difference between a timing associated with receiving the pre-emption indication and a timing associated with uplink communication resources included in the portion of the full duplex communication resources in the one or more slots satisfies a threshold. That is, the UE 115 may receive the pre-emption indication including a downlink pre-emption indication after the reception of the downlink resources 305. In some cases, the UE 115 may receive the pre-emption indication including an uplink pre-emption indication prior to the canceled uplink resources with time to enable the UE 115 to cancel the uplink resources 310.

Figure 4:
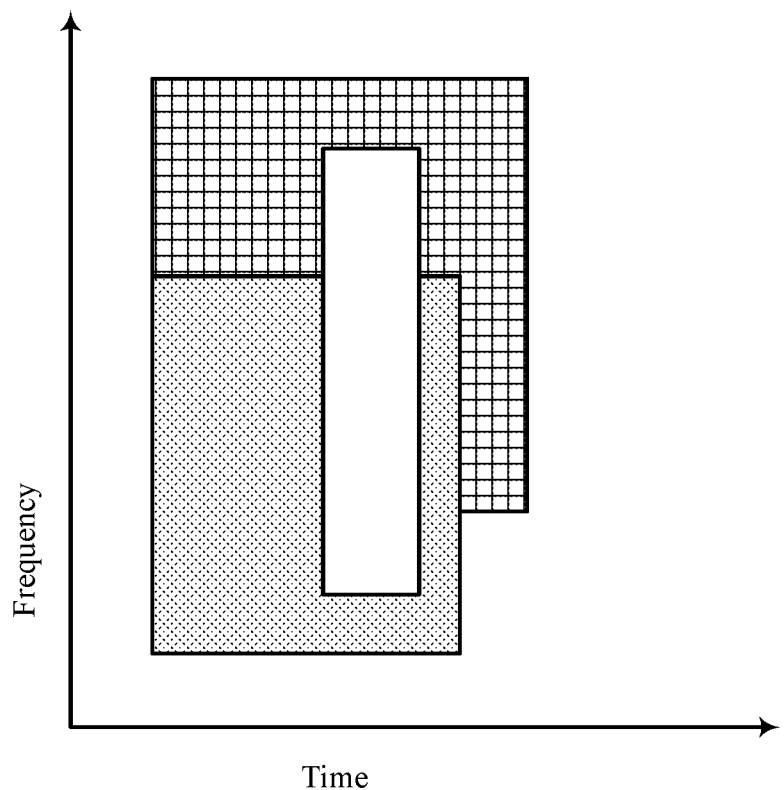
FIG. 4 illustrates an example of a resource configuration that supports pre-emption indication for full duplex communications in accordance with aspects of the present disclosure.
Figure 4:
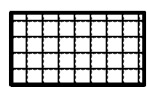
Figure 4:
Figure 4:

FIG. 4 illustrates an example of a resource configuration 400 that supports pre-emption indication for full duplex communications in accordance with aspects of the present disclosure. In some examples, the resource configuration 400 may implement aspects of the wireless communications systems 100 and the wireless communications systems 200. For example, the resource configuration 400 may be examples of the resource configurations configured (e.g., semi-statically for example by RRC signaling indicating a configuration, or dynamically for example by DCI signaling indicating a configuration) by a base station 105 (e.g., the base station 105-*a* described with reference to FIG. 2) according to the full duplex capability of a UE 115 (e.g., the UE 115-*a*, as described with reference to FIG. 2). In such examples, the resource configuration 400 may be an example of the resource configuration that the UE 115 and the base station 105 may use to support full duplex communications, which may support full duplex pre-emption indication to reduce or mitigate self-interference by one or more devices.

As described herein, the UE 115 and the base station 105 may support full duplex communications using one or more types of full duplex communications. For example, the UE 115 may identify one or more types of full duplex communications for each frequency band within resources identified by the UE 115. As described with reference to FIG. 4, the UE 115 may identify resources for full duplex communications with the base station 105. One or more frequency bands may be included within the resources identified by the UE 115, and each frequency band may be associated with a type of full duplex communication that may be supported by the UE 115. In some examples, the base station 105 may configure a resource configuration, such as resource configuration 400, for the UE 115. The UE 115 and the base station 105 may simultaneously transmit and/or receive on uplink resources 410 and downlink resources 405 based on the resource configuration.

In some examples, the UE 115 may support in-band full duplex, and the base station 105 may configure resource configuration 400 for simultaneous transmissions on uplink resources 410 and downlink resources 405. Resource configuration 400 may be an example where the resources provided for uplink resources 410 and downlink resources 405 may at least partially overlap. In such examples, uplink resources 410 and downlink resources 405 may share a first portion of their frequency allocation and may exclusively use a second portion of their frequency allocations for uplink and downlink communications.

According to one or more aspects of the present disclosure, the UE 115 may receive a configuration of full duplex communication resources for the UE 115 for a set of slots. As depicted in FIG. 4, the UE 115 may identify uplink resources 410 and downlink resources 405 based on the received configuration. According to one or more aspects, the base station 105 may transmit a full duplex pre-emption indication defined for full duplex UE after transmitting the configuration. In some examples, the full duplex pre-emption indication may include downlink pre-emption resources as well as uplink cancellation resources separately. For example, the pre-emption indication may identify that at least a portion of the full duplex communication resources in one or more slots of the plurality of slots is unavailable for communication with the UE 115. In some cases, the UE 115 may determine a remaining portion of the full duplex communication resources in the one or more slots based on the received pre-emption indication. As depicted in the example of FIG. 4, the pre-emption indication may indicate that the resources 415 are unavailable for communication by the UE 115.

As further depicted with reference to FIG. 3, the pre-emption indication may separately indicate uplink resources unavailable for communication within the resources for uplink resources 410 and downlink resources unavailable for communication within the downlink resources 405. In another example, the UE 115 may determine that the received pre-emption indication includes a first indication identifying that at least a portion of downlink resources 405 in the one or more slots is unavailable for communication with the UE, and a second indication identifying that at least a portion of uplink resources 410 in the one or more slots is unavailable for communication with the UE. In another example, the pre-emption indication may indicate unavailable downlink resources and unavailable uplink resources and resources common to both uplink and downlink. As described in the example of FIG. 4, the unavailable resources 415 may include at least a portion of downlink resources 405, at least a portion of uplink resources 410, and at least a portion of resources common to both downlink resources 405 and uplink resources 410. Additional or alternative implementations of the pre-emption indication as depicted with reference to FIG. 3, may also be applied to the resource configuration 400.

Figure 5:
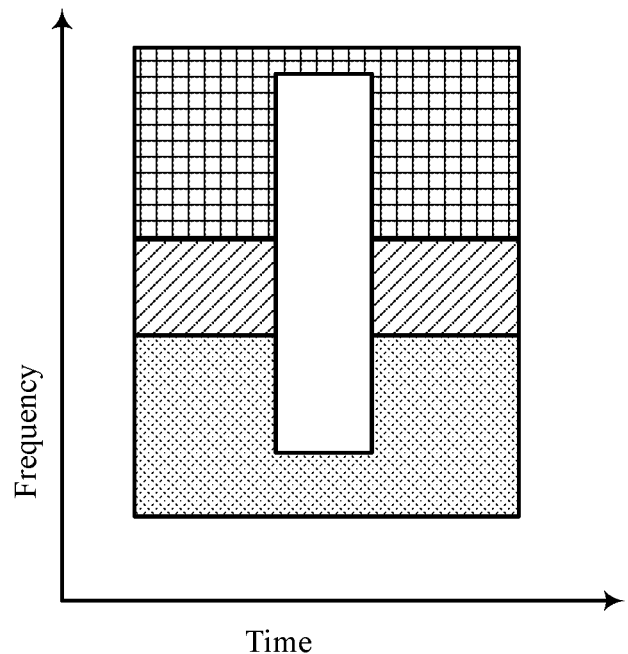
FIG. 5 illustrates an example of a resource configuration that supports pre-emption indication for full duplex communications in accordance with aspects of the present disclosure.

FIG. 5 illustrates an example of a resource configuration 500 that supports pre-emption indication for full duplex communications in accordance with aspects of the present disclosure. In some examples, the resource configuration 500 may implement aspects of the wireless communications systems 100 and the wireless communications systems 200. For example, the resource configuration 500 may be examples of the resource configurations configured by a base station 105 (e.g., the base station 105-*a* described with reference to FIG. 2) according to the full duplex capability of a UE 115 (e.g., the UE 115-*a*, as described with reference to FIG. 2). In such examples, the resource configuration 500 may be an example of the resource configuration that the UE 115 and the base station 105 may use to support full duplex communications, which may support full duplex pre-emption indication to reduce or mitigate self-interference by one or more devices.

As described herein, the UE 115 and the base station 105 may support full duplex communications using one or more types of full duplex communications. In some examples, the base station 105 may configure a resource configuration, such as resource configuration 500, for the UE 115. The UE 115 and the base station 105 may simultaneously transmit and/or receive uplink 510 and downlink 505 based on the resource configuration.

In some examples, the UE 115 may support sub-band full duplex for each of a number of frequency bands included in the resources identified for full duplex communications by the UE 115. In such examples, the base station 105 may configure a resource configuration 500. Resource configuration 500 may illustrate an example where uplink 510 and downlink 505 may be transmitted at the same time but may use different frequency resources. In some examples, the base station may separate the frequency resources provided for each of uplink 510 and downlink 505 by a guard band 520 (e.g., uplink 510 and downlink 505 may be associated with different bandwidth parts). In some examples, by identifying a frequency resource (e.g., one or more frequency bands) that supports sub-band full duplex, the UE 115 may reduce self-interference by transmitting and receiving using two different frequencies.

The guard band 520 may be a frequency range that separates the frequencies used for uplink 510 and downlink 505 and may be included in the resource configuration 500 by the base station 105 based on identifying that the UE 115 supports sub-band full duplex. The base station 105 may define (e.g., configure) the guard band 520 (e.g., may determine a guard band configuration) based on a number of different features of the full duplex communications. In some cases, the guard band configuration may indicate a number of resource blocks (e.g., physical resource blocks) and/or a number of resource elements for the guard band. That is, the guard band 520 may be defined in terms of physical resource blocks and/or resource elements via a guard band configuration.

As described with reference to FIGS. 3 and 4, the UE 115 may receive a configuration of full duplex communication resources for the UE 115 for a set of slots. The UE 115 may identify resources for uplink 510 and resources for downlink 505 based on the received configuration. According to one or more aspects, the base station 105 may transmit a full duplex pre-emption indication defined for full duplex UE after transmitting the configuration. In some examples, the full duplex pre-emption indication may include downlink pre-emption resources as well as uplink cancellation resources separately. For example, the pre-emption indication may identify that at least a portion of the full duplex communication resources in one or more slots of the plurality of slots is unavailable for communication with the UE 115. In some cases, the UE 115 may determine a remaining portion of the full duplex communication resources in the one or more slots based on the received pre-emption indication. As depicted in the example of FIG. 5, the pre-emption indication may indicate that the resources 515 are unavailable for communication by the UE 115. It may be understood that additional or alternative implementations of the pre-emption indication as depicted with reference to FIGS. 3 and 4, may also be applied to the resource configuration 500.

Figure 6:
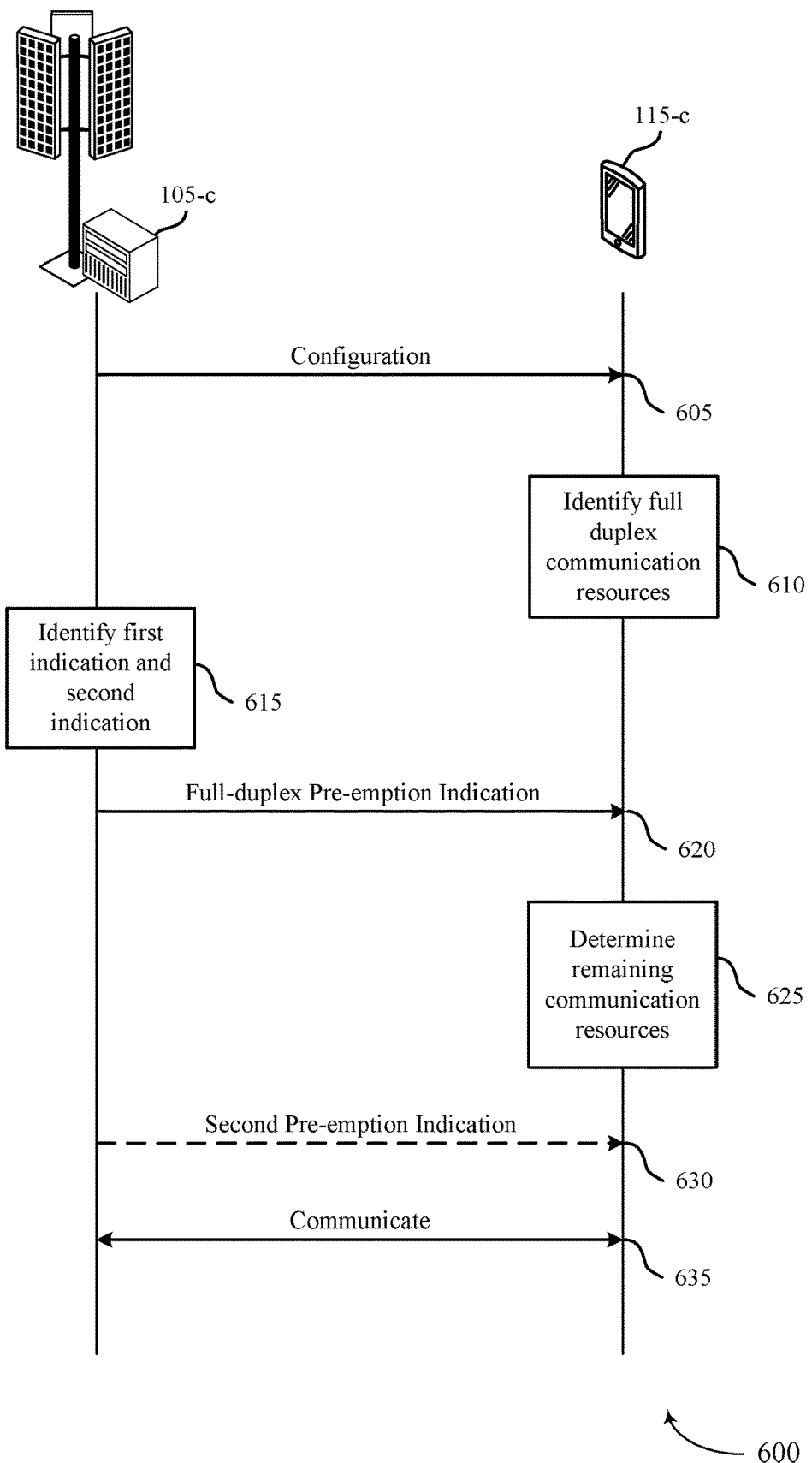
FIG. 6 illustrates an example of a process flow that supports pre-emption indication for full duplex communications in accordance with aspects of the present disclosure.

FIG. 6 illustrates an example of a process flow 600 that supports pre-emption indication for full duplex communications in accordance with aspects of the present disclosure. In some examples, the process flow 600 may implement aspects of the wireless communications system 100 and 200 described with reference to FIGS. 1 and 2, respectively. For example, the process flow 600 may be based on a signaling procedure to indicate a full duplex pre-emption indication from a base station 105-c and a UE 115-c. The process flow 600 may be implemented by the UE 115-c and the base station 105-c for reduced power consumption, and may promote low latency for wireless communications, among other benefits. The base station 105-c and the UE 115-c may be examples of a base station 105 and a UE 115, as described with reference to FIGS. 1 and 2. In the following description of the process flow 600, the operations between the base station 105-c and the UE 115-c may be transmitted in a different order than the example order shown, or the operations performed by the base station 105-c and the UE 115-c may be performed in different orders or at different times. Some operations may also be omitted from the process flow 600, and other operations may be added to the process flow 600.

At 605, the UE 115-c may receive a configuration of full duplex communication resources for the UE 115-c for a set of slots. At 610, the UE 115-c may identify the full duplex communication resources based on receiving the configuration. In some examples, the full duplex communication resources may include downlink resources and uplink resources.

At 615, the base station 105-c may identify a first indication and a second indication. In some examples, the first indication may identify that at least a portion of downlink communication resources in one or more slots is unavailable for communication with the UE 115-c, and the second indication may identify that at least a portion of uplink communication resources in the one or more slots is unavailable for communication with the UE 115-c. The base station 105-c may include the first indication and the second indication in a full duplex pre-emption indication.

At 620, the UE 115-c may receive, from the base station 105-c, a pre-emption indication identifying that at least a portion of the full duplex communication resources in one or more slots of the set of slots is unavailable for communication with the UE 115-c. For example, the pre-emption indication (e.g., a full duplex pre-emption indication) may be defined to indicate to the UE 115-c some resources where downlink transmission is absent or some resources where an uplink resources have been canceled by the base station 105-c. In some cases, a periodicity of the pre-emption indication may correspond to a periodicity of the set of slots. Additionally or alternatively, the base station 105-c may include the pre-emption indication in a sequence or a physical downlink control channel. In some examples, the pre-emption indication may be conveyed explicitly, for example by one or more bits in a DCI. In other examples, the pre-emption indication may be conveyed implicitly, for example by a particular arrangement or combination of bits otherwise used to convey other information in a DCI. Such DCI may grant one or more sets of uplink communication resources, one or more sets of downlink communication resources, or a combination of these.

At 625, the UE 115-c may determine a remaining portion of the full duplex communication resources in the one or more slots based on the received pre-emption indication. For example, the UE 115-c may determine that the unavailable portion of the full duplex communication resources in the one or more slots includes downlink communication resources. Additionally or alternatively, the UE 115-c may determine that the unavailable portion of the full duplex communication resources in the one or more slots includes uplink communication resources.

At 630, the UE 115-c may optionally receive, from the base station 105-c, a second pre-emption indication. In some examples, the second pre-emption indication may include a downlink pre-emption indication or an uplink pre-emption indication. In some examples, the UE 115-c may determine the remaining portion of the full duplex communication resources in the one or more slots based on the received pre-emption indication and the received second pre-emption indication. Alternatively, the UE 115-c may assume that the second pre-emption indication is absent based on the received pre-emption indication and the received second pre-emption indication.

At 635, the UE 115-c may communicate with the base station 105-c using the remaining portion of the full duplex communication resources.

The operations performed by the base station 105-c and the UE 115-c as part of, but not limited to, process flow 600 may provide improvements to full duplex communications based on full duplex pre-emption indication transmission. Further, the operations performed by the base station 105-c and the UE 115-c as part of, but not limited to, process flow 600 may provide benefits and enhancements to the operation of the UE 115-c. For example, the described full duplex pre-emption indication transmission operations in the process flow 600 may support reduced power consumption, increased efficiency, among other advantages.

Figure 7:
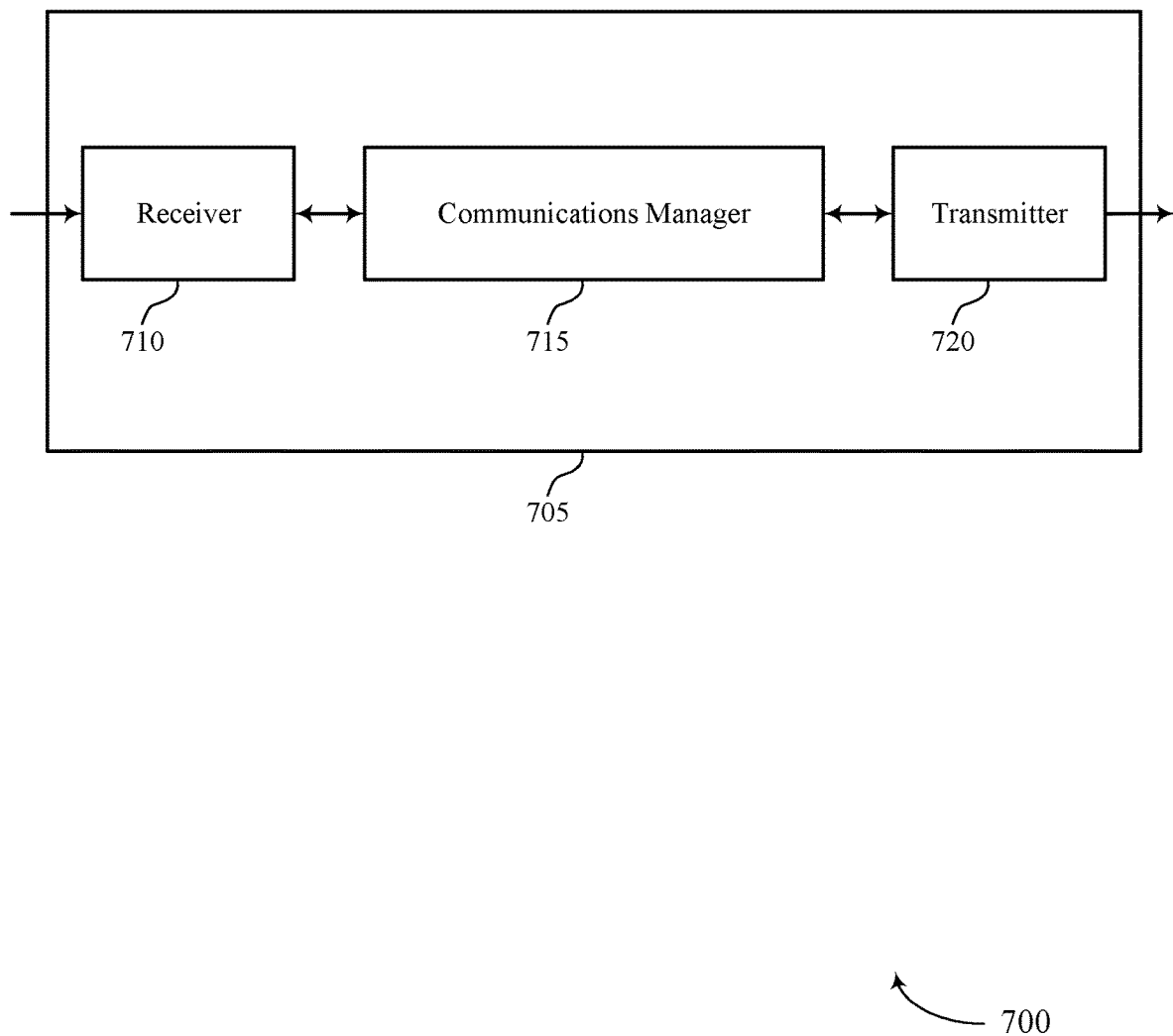
FIGS. 7 and 8 show block diagrams of devices that support pre-emption indication for full duplex communications in accordance with aspects of the present disclosure.

FIG. 7 shows a block diagram 700 of a device 705 that supports pre-emption indication for full duplex communications in accordance with aspects of the present disclosure. The device 705 may be an example of aspects of a UE 115 as described herein. The device 705 may include a receiver 710, a communications manager 715, and a transmitter 720. The device 705 may also include a one or more processors, memory coupled with the one or more processors, and instructions stored in the memory that are executable by the one or more processors to enable the one or more processors to perform the pre-emption indication for full duplex communications features discussed herein. Each of these components may be in communication with one another (e.g., via one or more buses).

The receiver 710 may receive information such as packets, user data, or control information associated with various information channels (e.g., control channels, data channels, and information related to pre-emption indication for full duplex communications, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, a configuration of full duplex communication resources for the UE for a set of slots, receive, from the base station, a pre-emption indication identifying that at least a portion of the full duplex communication resources in one or more slots of the set of slots is unavailable for communication with the UE, determine a remaining portion of the full duplex communication resources in the one or more slots based on the received pre-emption indication, and communicate with the base station using the remaining portion of the full duplex communication resources. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
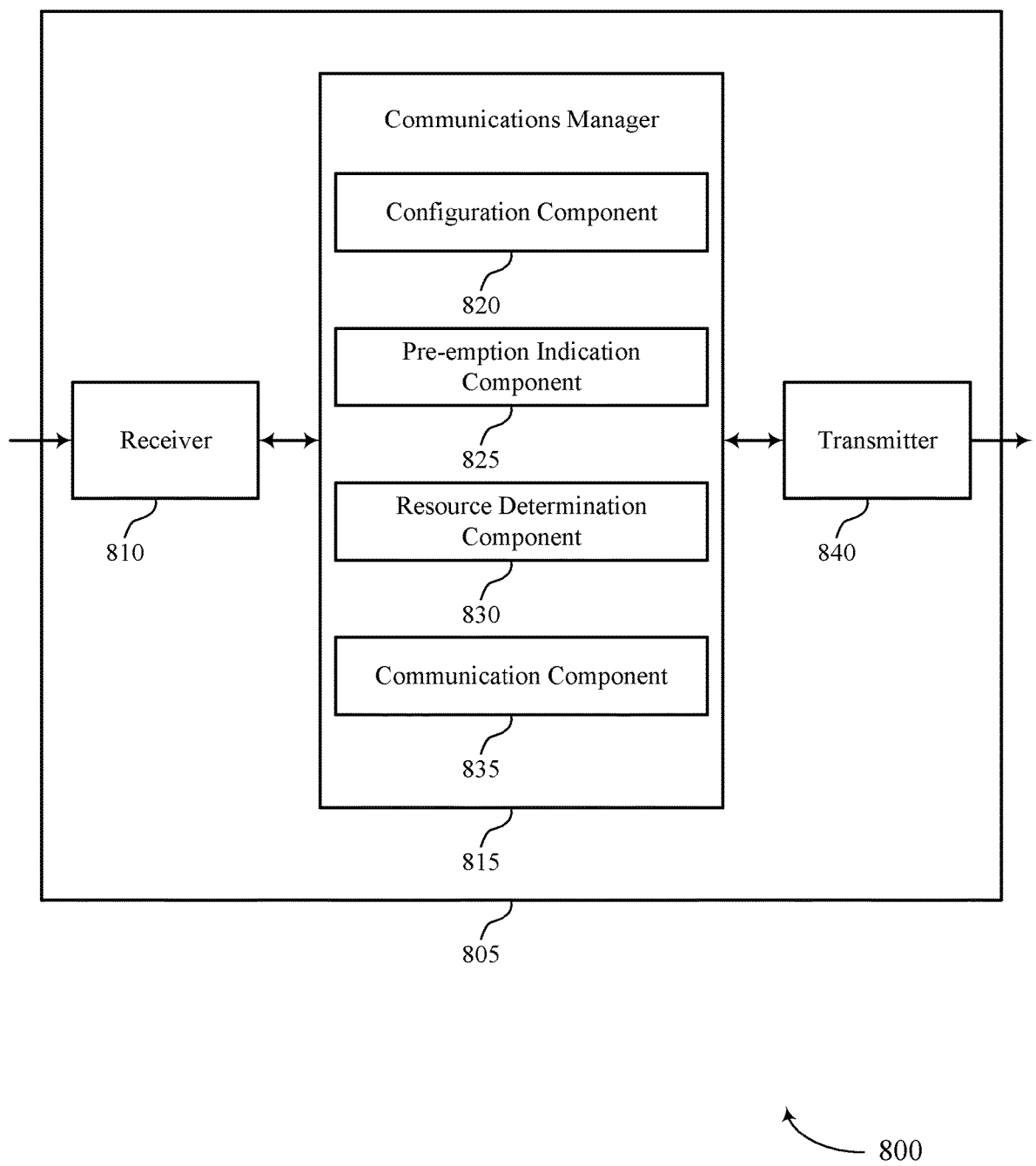

FIG. 8 shows a block diagram 800 of a device 805 that supports pre-emption indication for full duplex communications in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to pre-emption indication for full duplex communications, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a configuration component 820, a pre-emption indication component 825, a resource determination component 830, and a communication component 835. The communications manager 815 may be an example of aspects of the communications manager 1010 described herein.

The configuration component 820 may receive, from a base station, a configuration of full duplex communication resources for the UE for a set of slots. The pre-emption indication component 825 may receive, from the base station, a pre-emption indication identifying that at least a portion of the full duplex communication resources in one or more slots of the set of slots is unavailable for communication with the UE. The resource determination component 830 may determine a remaining portion of the full duplex communication resources in the one or more slots based on the received pre-emption indication. The communication component 835 may communicate with the base station using the remaining portion of the full duplex communication resources.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

In some cases, the configuration component 820, the pre-emption indication component 825, the resource determination component 830, and the communication component 835 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the configuration component 820, the pre-emption indication component 825, the resource determination component 830, and the communication component 835 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 9:
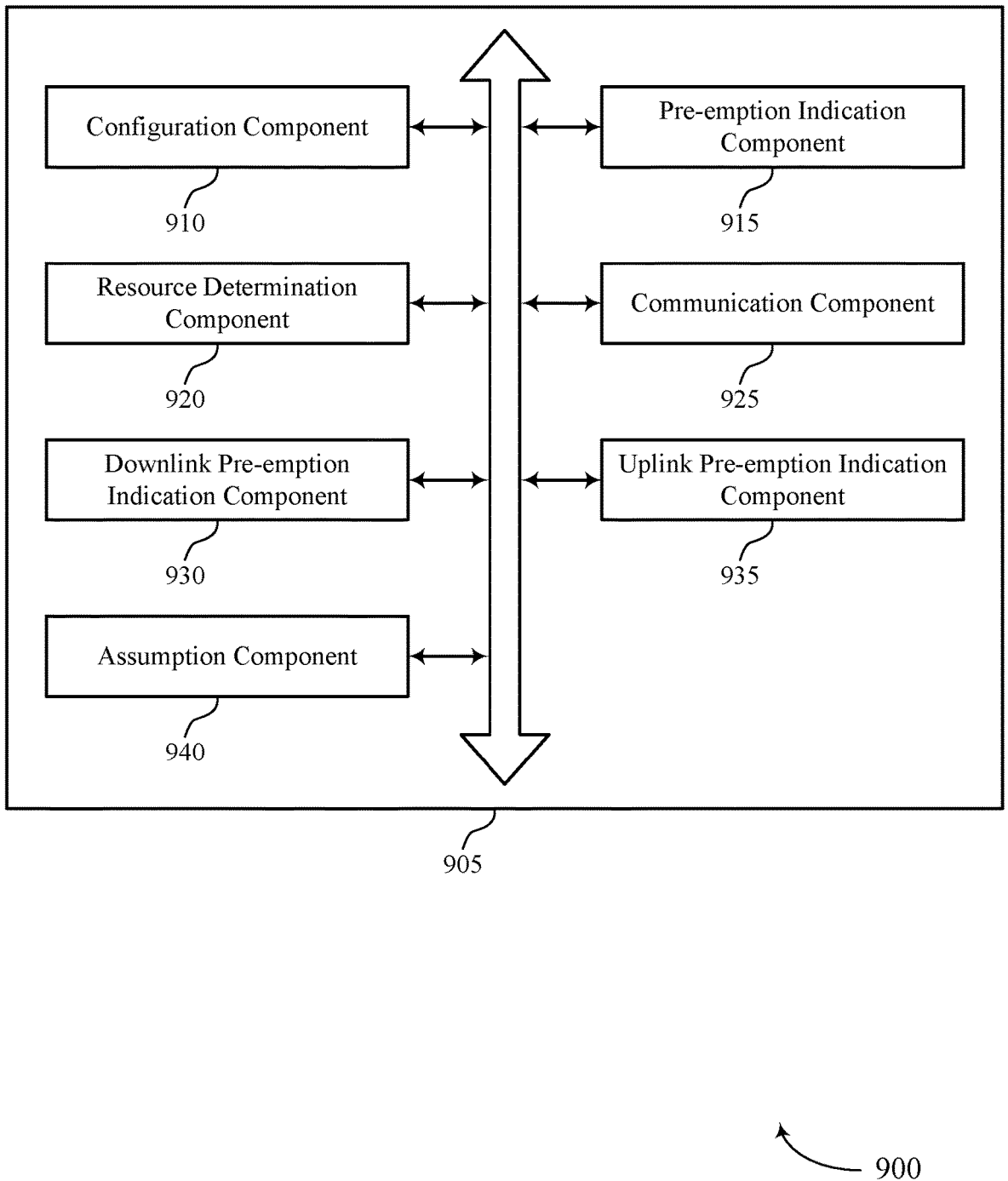
FIG. 9 shows a block diagram of a communications manager that supports pre-emption indication for full duplex communications in accordance with aspects of the present disclosure.

FIG. 9 shows a block diagram 900 of a communications manager 905 that supports pre-emption indication for full duplex communications in accordance with aspects of the present disclosure. The communications manager 905 may be an example of aspects of a communications manager 715, a communications manager 815, or a communications manager 1010 described herein. The communications manager 905 may include a configuration component 910, a pre-emption indication component 915, a resource determination component 920, a communication component 925, a downlink pre-emption indication component 930, an uplink pre-emption indication component 935, and an assumption component 940. Each of these modules may communicate, directly or indirectly, with one another (e.g., via one or more buses).

The configuration component 910 may receive, from a base station, a configuration of full duplex communication resources for the UE for a set of slots. The pre-emption indication component 915 may receive, from the base station, a pre-emption indication identifying that at least a portion of the full duplex communication resources in one or more slots of the set of slots is unavailable for communication with the UE. The resource determination component

920 may determine a remaining portion of the full duplex communication resources in the one or more slots based on the received pre-emption indication. The communication component 925 may communicate with the base station using the remaining portion of the full duplex communication resources.

In some examples, the pre-emption indication component 915 may determine that the received pre-emption indication identifies that at least a portion of downlink communication resources and at least a portion of uplink communication resources in the one or more slots is unavailable for communication with the UE, where the received pre-emption indication includes a downlink pre-emption indication or an uplink pre-emption indication.

In some examples, the pre-emption indication component 915 may determine that the received pre-emption indication includes a first indication and a second indication, the first indication identifying that at least a portion of downlink communication resources in the one or more slots is unavailable for communication with the UE, and the second indication identifying that at least a portion of uplink communication resources in the one or more slots is unavailable for communication with the UE, where determining the remaining portion of the full duplex communication resources is based on the first indication and the second indication. In some examples, the pre-emption indication component 915 may receive the first indication and the second indication via a downlink control information message.

In some examples, the pre-emption indication component 915 may receive a downlink control information message from the base station. In some examples, the pre-emption indication component 915 may determine that the portion of the full duplex communication resources in the one or more slots includes downlink communication resources based on the received downlink control information message. In some examples, the pre-emption indication component 915 may determine that the portion of the full duplex communication resources in the one or more slots includes uplink communication resources based on the received downlink control information message.

In some examples, the pre-emption indication component 915 may receive, from the base station, a downlink control information message indicating at least one of a first set of resources, a second set of resources, a third set of resources, or a combination thereof. In some cases, the first set of resources includes uplink communication resources, the second set of resources includes downlink communication resources, and the third set of resources includes resources common to uplink communication and downlink communication, and where determining the remaining portion of the full duplex communication resources is based on the first set of resources, the second set of resources, and the third set of resources.

In some examples, the pre-emption indication component 915 may determine that a first subset of the portion of the full duplex communication resources in the one or more slots includes downlink communication resources based on the received pre-emption indication. In some examples, the pre-emption indication component 915 may determine that a second subset of the portion of the full duplex communication resources in the one or more slots includes uplink communication resources based on the received pre-emption indication.

In some cases, the first subset and the second subset are non-overlapping subsets. In some cases, the first subset and the second subset are overlapping subsets. In some cases, a maximum size of the downlink communication resources corresponds to a bandwidth part associated with downlink communication and a maximum size of the uplink communication resources corresponds to a bandwidth part associated with uplink communication.

In some examples, the pre-emption indication component 915 may determine that the pre-emption indication is absent based on determining that the set of slots is less than a threshold number of slots. In some cases, the threshold number of slots includes one slot.

The downlink pre-emption indication component 930 may receive, from the base station, a downlink pre-emption indication identifying that a portion of downlink communication resources in the one or more slots is unavailable for communication with the UE. In some examples, the resource determination component 920 may determine the remaining portion of the full duplex communication resources in the one or more slots based on the received pre-emption indication and the received downlink pre-emption indication.

The uplink pre-emption indication component 935 may receive, from the base station, an uplink pre-emption indication identifying that a portion of uplink communication resources in the one or more slots is unavailable for communication with the UE. In some examples, the resource determination component 920 may determine the remaining portion of the full duplex communication resources in the one or more slots based on the received pre-emption indication and the received uplink pre-emption indication.

The assumption component 940 may assume that the downlink pre-emption indication is absent based on the received pre-emption indication and the received downlink pre-emption indication. In some examples, the assumption component 940 may assume that the uplink pre-emption indication is absent based on the received pre-emption indication and the received uplink pre-emption indication.

In some cases, a periodicity of the pre-emption indication corresponds to a periodicity of the set of slots. In some cases, the pre-emption indication is included in at least a sequence, a physical downlink control channel, or a combination thereof. In some cases, the pre-emption indication is a full duplex pre-emption indication.

In some examples, the pre-emption indication component 915 may determine the remaining portion of the full duplex communication resources is further based on determining that the portion of the full duplex communication resources in the one or more slots includes uplink communication resources or downlink communication resources, or both. In some cases, the portion of the full duplex communication resources in the one or more slots are indicated via at least one of a bitmap, a start indicator, a length indicator, or a combination thereof. In some cases, a difference between a timing associated with receiving the pre-emption indication and a timing associated with uplink communication resources included in the portion of the full duplex communication resources in the one or more slots satisfies a threshold.

In some cases, the configuration component 910, the pre-emption indication component 915, the resource determination component 920, the communication component 925, the downlink pre-emption indication component 930, the uplink pre-emption indication component 935, and the assumption component 940 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the configuration component 910, the pre-emption indication component 915, the resource determination component 920, the communication component 925, the downlink pre-emption indication component 930, the uplink pre-emption indication component 935, and the assumption component 940 discussed herein.

Figure 10:
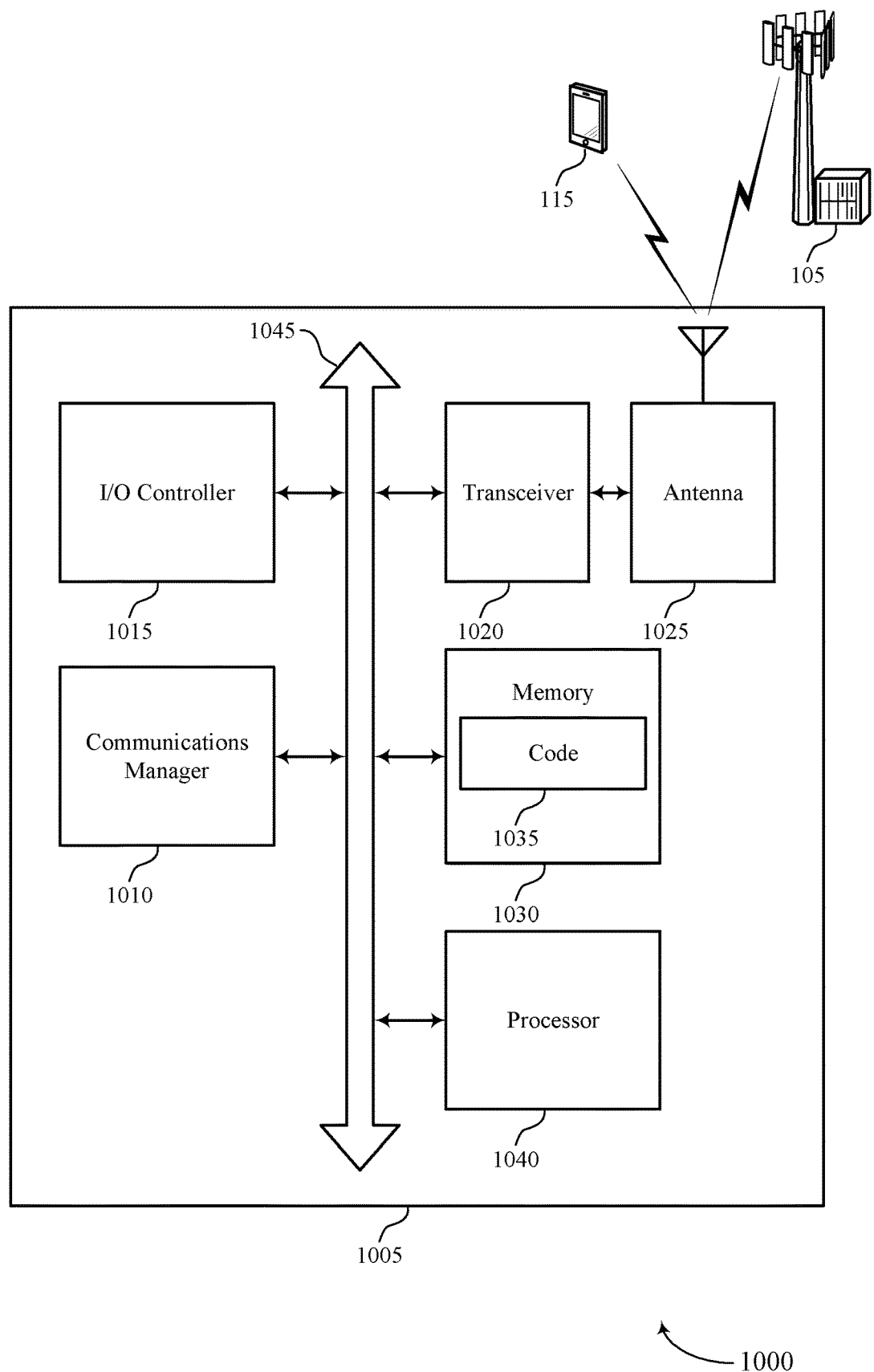
FIG. 10 shows a diagram of a system including a device that supports pre-emption indication for full duplex communications in accordance with aspects of the present disclosure.

FIG. 10 shows a diagram of a system 1000 including a device 1005 that supports pre-emption indication for full duplex communications in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a base station, a configuration of full duplex communication resources for the UE for a set of slots, receive, from the base station, a pre-emption indication identifying that at least a portion of the full duplex communication resources in one or more slots of the set of slots is unavailable for communication with the UE, determine a remaining portion of the full duplex communication resources in the one or more slots based on the received pre-emption indication, and communicate with the base station using the remaining portion of the full duplex communication resources.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting pre-emption indication for full duplex communications).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
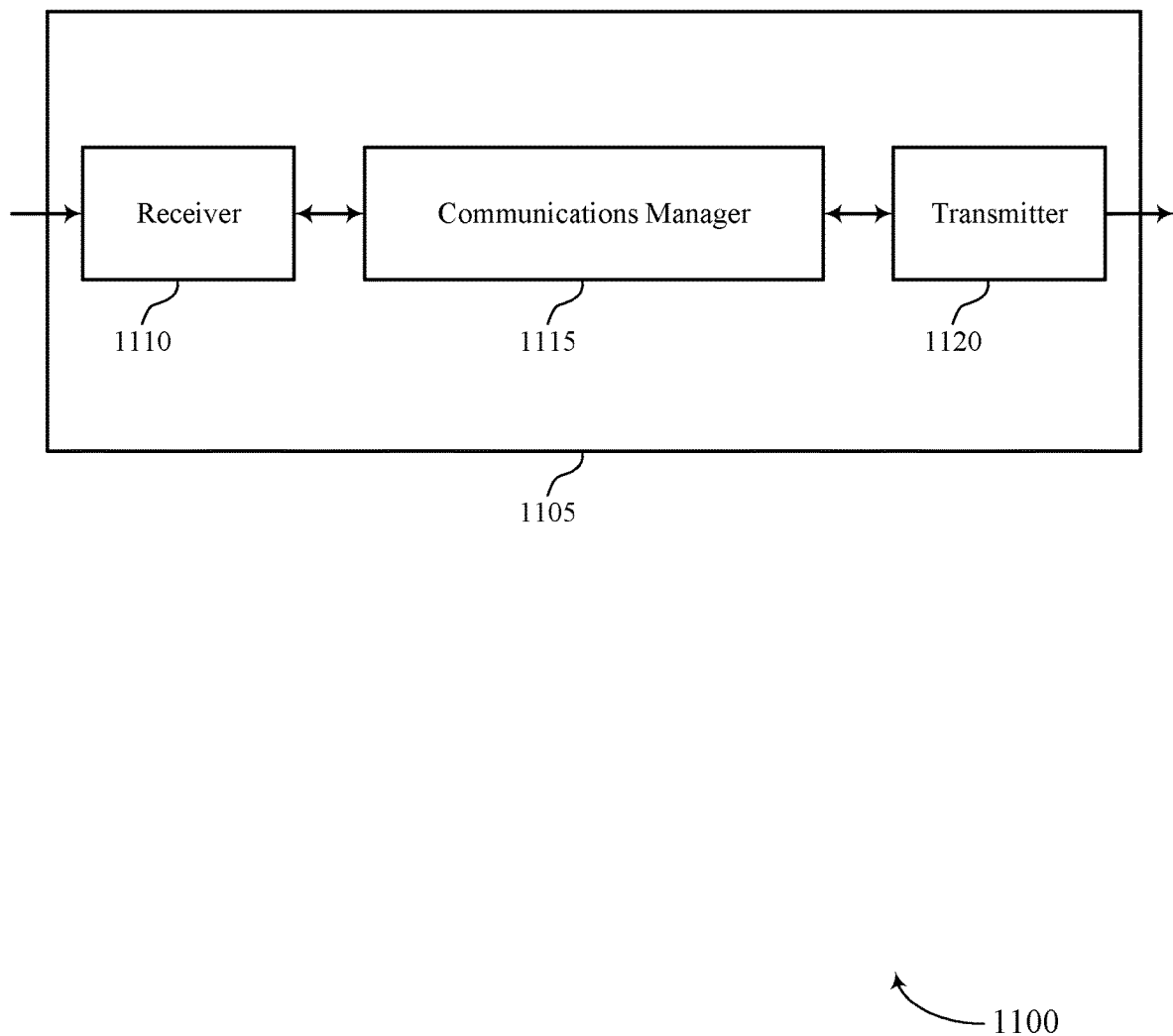
FIGS. 11 and 12 show block diagrams of devices that support pre-emption indication for full duplex communications in accordance with aspects of the present disclosure.

FIG. 11 shows a block diagram 1100 of a device 1105 that supports pre-emption indication for full duplex communications in accordance with aspects of the present disclosure. The device 1105 may be an example of aspects of a base station 105 as described herein. The device 1105 may include a receiver 1110, a communications manager 1115, and a transmitter 1120. The device 1105 may also include one or more processors, memory coupled with the one or more processors, and instructions stored in the memory that are executable by the one or more processors to enable the one or more processors to perform the pre-emption indication for full duplex communications features discussed herein. Each of these components may be in communication with one another (e.g., via one or more buses).

The receiver 1110 may receive information such as packets, user data, or control information associated with various information channels (e.g., control channels, data channels, and information related to pre-emption indication for full duplex communications, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to a UE, a configuration of full duplex communication resources for the UE for a set of slots, determine that a portion of the full duplex communication resources in one or more slots of the set of slots is unavailable for communication with the UE and that a remaining portion of the full duplex communication resources in the one or more slots is available for communication with the UE, transmit, to the UE, a pre-emption indication identifying the determined portion of the full duplex communication resources in the one or more slots is unavailable for communication with the UE, and communicate with the UE using the determined remaining portion of the full duplex communication resources in the one or more slots based on transmitting the pre-emption indication. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
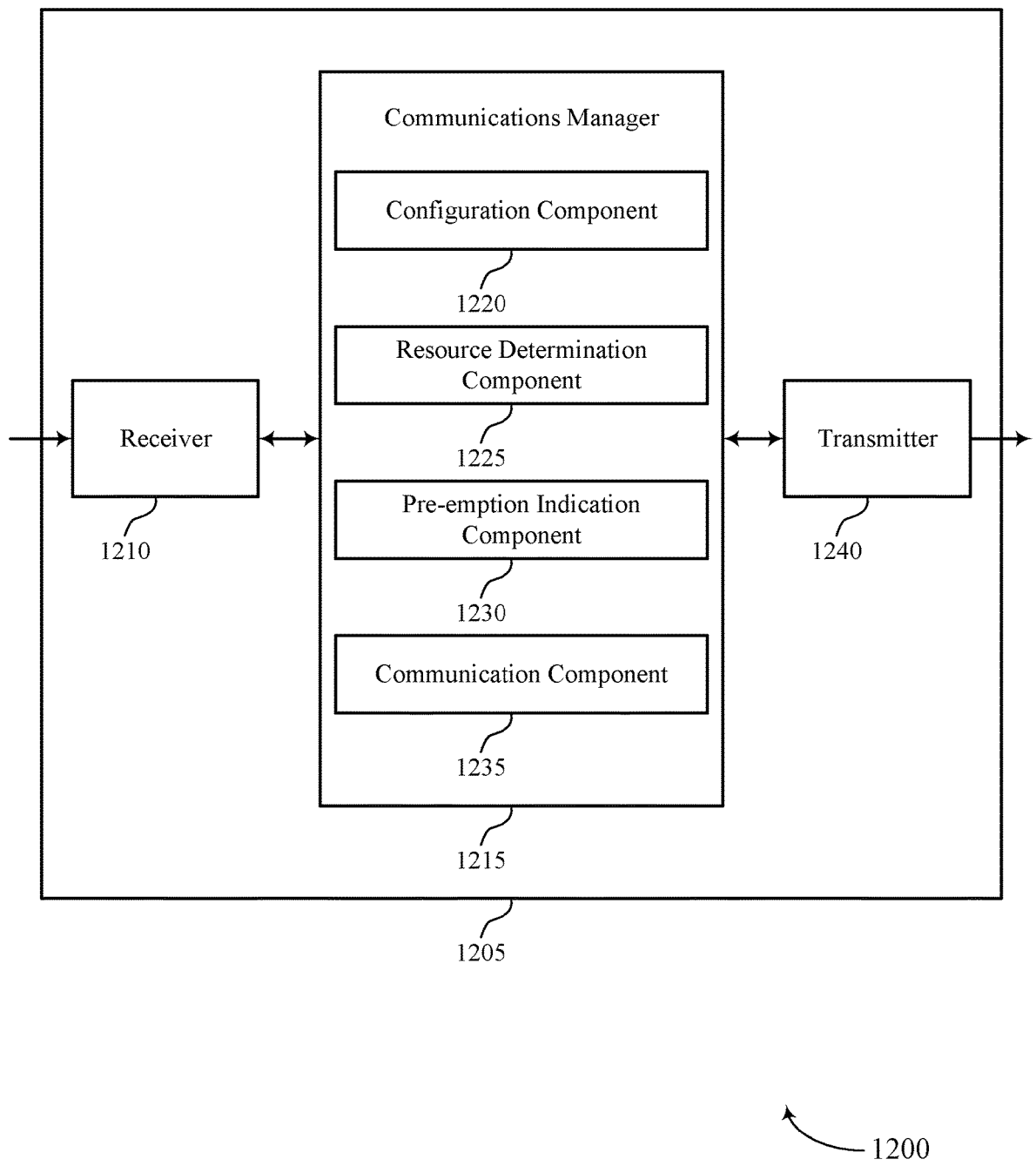

FIG. 12 shows a block diagram 1200 of a device 1205 that supports pre-emption indication for full duplex communications in accordance with aspects of the present disclosure. The device 1205 may be an example of aspects of a device 1105, or a base station 105 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to pre-emption indication for full duplex communications, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a configuration component 1220, a resource determination component 1225, a pre-emption indication component 1230, and a communication component 1235. The communications manager 1215 may be an example of aspects of the communications manager 1410 described herein.

The configuration component 1220 may transmit, to a UE, a configuration of full duplex communication resources for the UE for a set of slots. The resource determination component 1225 may determine that a portion of the full duplex communication resources in one or more slots of the set of slots is unavailable for communication with the UE and that a remaining portion of the full duplex communication resources in the one or more slots is available for communication with the UE. The pre-emption indication component 1230 may transmit, to the UE, a pre-emption indication identifying the determined portion of the full duplex communication resources in the one or more slots is unavailable for communication with the UE. The communication component 1235 may communicate with the UE using the determined remaining portion of the full duplex communication resources in the one or more slots based on transmitting the pre-emption indication.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

In some cases, the configuration component 1220, the resource determination component 1225, the pre-emption indication component 1230, and the communication component 1235 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the configuration component 1220, the resource determination component 1225, the pre-emption indication component 1230, and the communication component 1235 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 13:
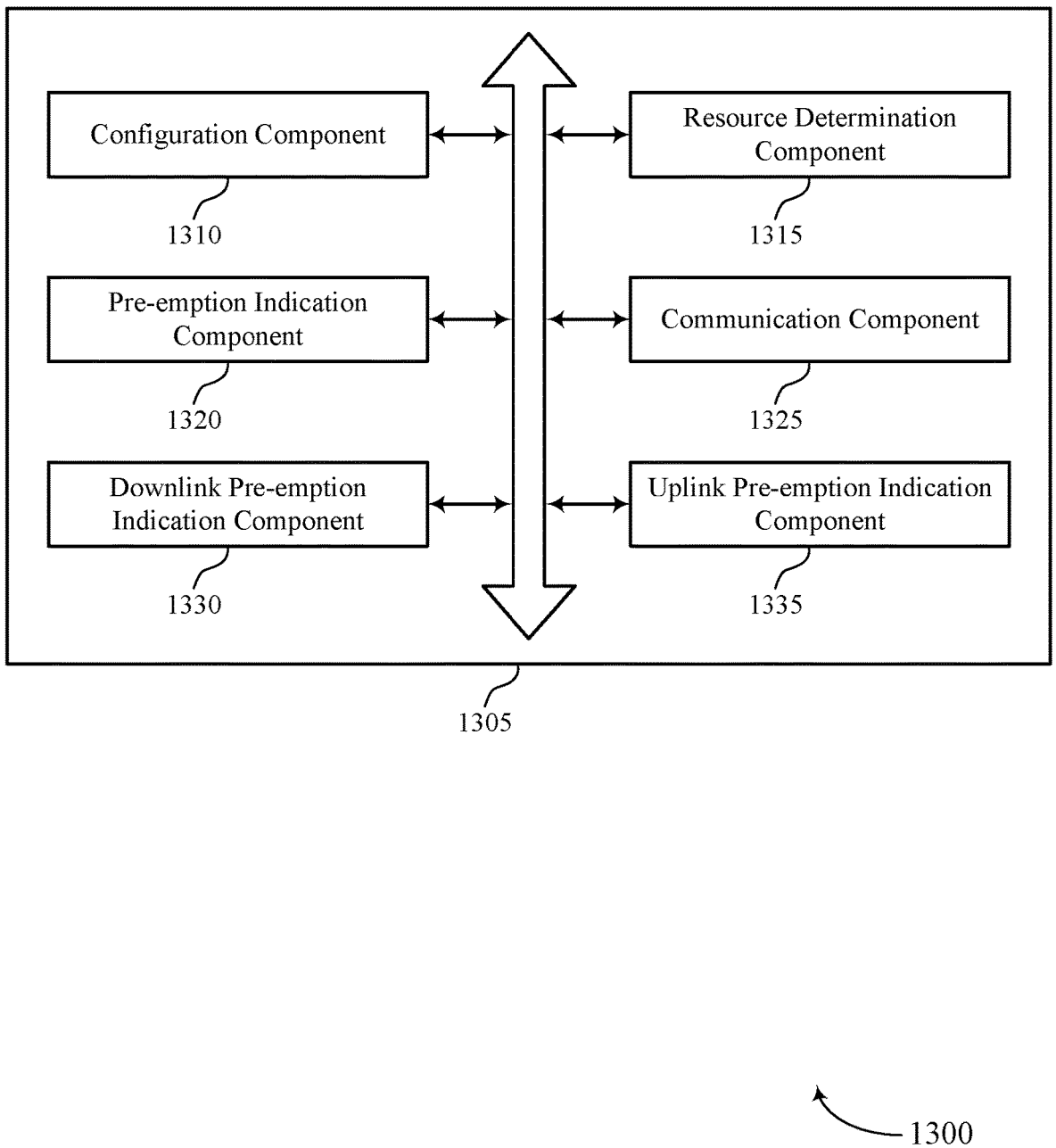
FIG. 13 shows a block diagram of a communications manager that supports pre-emption indication for full duplex communications in accordance with aspects of the present disclosure.

FIG. 13 shows a block diagram 1300 of a communications manager 1305 that supports pre-emption indication for full duplex communications in accordance with aspects of the present disclosure. The communications manager 1305 may be an example of aspects of a communications manager 1115, a communications manager 1215, or a communications manager 1410 described herein. The communications manager 1305 may include a configuration component 1310, a resource determination component 1315, a pre-emption indication component 1320, a communication component 1325, a downlink pre-emption indication component 1330, and an uplink pre-emption indication component 1335. Each of these modules may communicate, directly or indirectly, with one another (e.g., via one or more buses).

The configuration component 1310 may transmit, to a UE, a configuration of full duplex communication resources for the UE for a set of slots. The resource determination component 1315 may determine that a portion of the full duplex communication resources in one or more slots of the set of slots is unavailable for communication with the UE and that a remaining portion of the full duplex communication resources in the one or more slots is available for communication with the UE.

The pre-emption indication component 1320 may transmit, to the UE, a pre-emption indication identifying the determined portion of the full duplex communication resources in the one or more slots is unavailable for communication with the UE. The communication component 1325 may communicate with the UE using the determined remaining portion of the full duplex communication resources in the one or more slots based on transmitting the pre-emption indication.

In some cases, a periodicity of the pre-emption indication corresponds to a periodicity of the set of slots. In some cases, the pre-emption indication is included in at least a sequence, a physical downlink control channel, or a combination thereof. In some cases, a difference between a timing associated with receiving the pre-emption indication and a timing associated with uplink communication resources included in the portion of the full duplex communication resources in the one or more slots satisfies a threshold. In some cases, the pre-emption indication is a full duplex pre-emption indication.

In some examples, the pre-emption indication component 1320 may transmit a first indication identifying that at least a portion of downlink communication resources in the one or more slots is unavailable for communication with the UE. In some examples, the pre-emption indication component 1320 may transmit a second indication identifying that at least a portion of uplink communication resources in the one or more slots is unavailable for communication with the UE, where the remaining portion of the full duplex communication resources is based on the first indication and the second indication. In some examples, the pre-emption indication component 1320 may transmit the first indication and the second indication via a downlink control information message.

In some examples, the resource determination component 1315 may determine that the portion of the full duplex communication resources in the one or more slots includes downlink communication resources. In some examples, the pre-emption indication component 1320 may transmit, to a UE, a downlink control information message identifying the downlink communication resources.

In some examples, the resource determination component 1315 may determine that the portion of the full duplex communication resources in the one or more slots includes uplink communication resources. In some examples, the pre-emption indication component 1320 may transmit, to a UE, a downlink control information message identifying the uplink communication resources.

In some examples, the resource determination component 1315 may determine that a first set of resources includes uplink communication resources, a second set of resources includes downlink communication resources, and a third set of resources includes resources common to uplink communication and downlink communication, where the remaining portion of the full duplex communication resources is based on the first set of resources, the second set of resources and the third set of resources. In some examples, the pre-emption indication component 1320 may transmit a downlink control information message indicating at least one of the first set of resources, the second set of resources, the third set of resources, or a combination thereof.

In some cases, a first subset of the portion of the full duplex communication resources includes downlink communication resources, a second subset of the portion of the full duplex communication resources includes uplink communication resources, and the pre-emption indication identifies the first subset and the second subset. In some cases, the first subset and the second subset are non-overlapping subsets. In some cases, the first subset and the second subset are overlapping subsets.

In some cases, the portion of the full duplex communication resources in the one or more slots are indicated via at least one of a bitmap, a start indicator, a length indicator, or a combination thereof. In some cases, a maximum size of the downlink communication resources corresponds to a bandwidth part associated with downlink communication and a maximum size of the uplink communication resources corresponds to a bandwidth part associated with uplink communication.

In some examples, the resource determination component 1315 may determine that a portion of downlink communication resources in the one or more slots is unavailable for communication with the UE. The downlink pre-emption indication component 1330 may transmit, to the UE, a downlink pre-emption indication identifying the determined portion of downlink communication resources, where the remaining portion of the full duplex communication resources in the one or more slots is based on the transmitted pre-emption indication and the transmitted downlink pre-emption indication.

In some examples, the resource determination component 1315 may determine that a portion of uplink communication resources in the one or more slots is unavailable for communication with the UE. The uplink pre-emption indication component 1335 may transmit, to the UE, an uplink pre-emption indication identifying the determined portion of uplink communication resources, where the remaining portion of the full duplex communication resources in the one or more slots is based on the transmitted pre-emption indication and the transmitted uplink pre-emption indication.

In some cases, the configuration component 1310, the resource determination component 1315, the pre-emption indication component 1320, the communication component 1325, the downlink pre-emption indication component 1330, and the uplink pre-emption indication component 1335 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the configuration component 1310, the resource determination component 1315, the pre-emption indication component 1320, the communication component 1325, the downlink pre-emption indication component 1330, and the uplink pre-emption indication component 1335 discussed herein.

Figure 14:
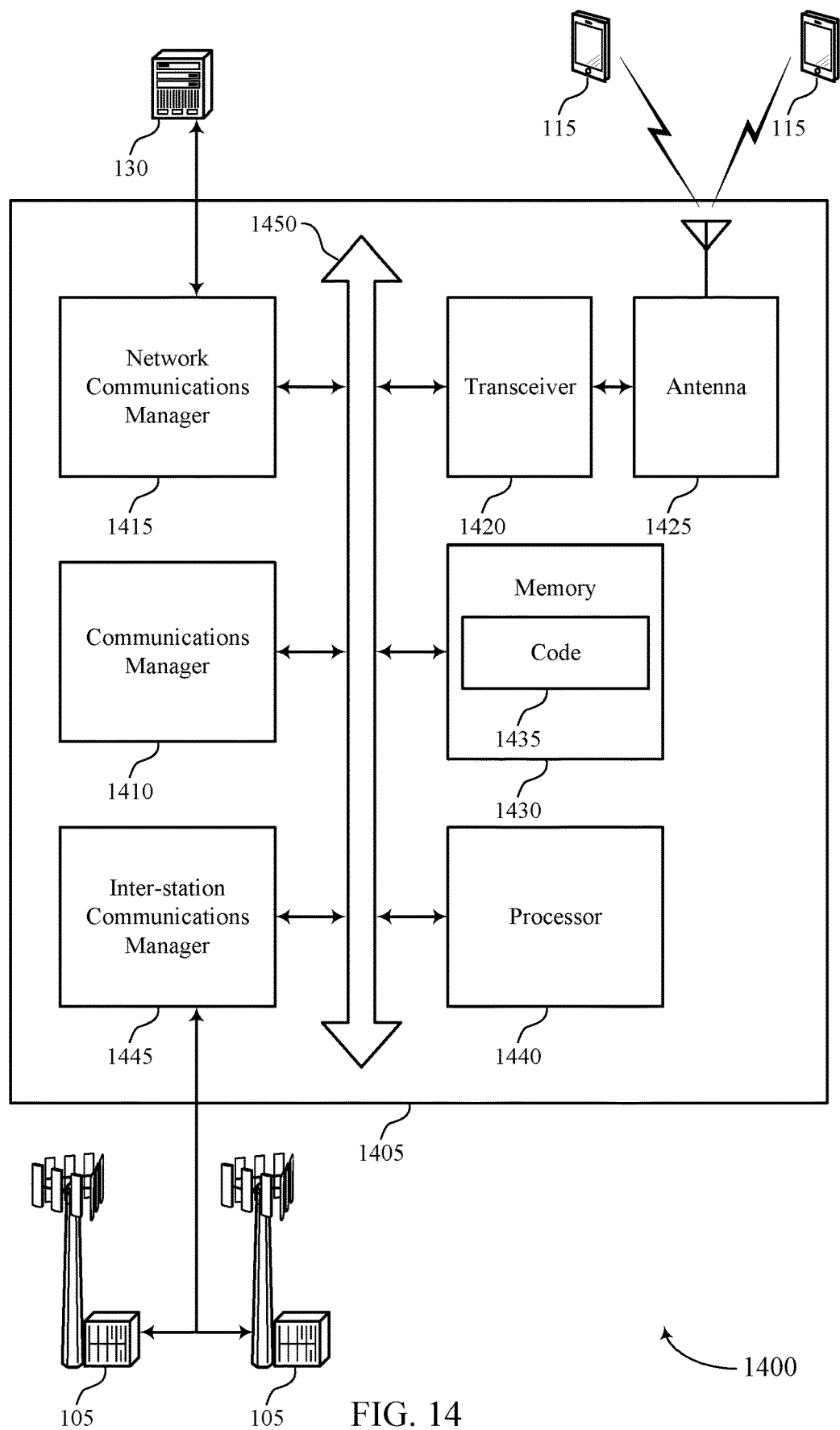
FIG. 14 shows a diagram of a system including a device that supports pre-emption indication for full duplex communications in accordance with aspects of the present disclosure.

FIG. 14 shows a diagram of a system 1400 including a device 1405 that supports pre-emption indication for full duplex communications in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit, to a UE, a configuration of full duplex communication resources for the UE for a set of slots, determine that a portion of the full duplex communication resources in one or more slots of the set of slots is unavailable for communication with the UE and that a remaining portion of the full duplex communication resources in the one or more slots is available for communication with the UE, transmit, to the UE, a pre-emption indication identifying the determined portion of the full duplex communication resources in the one or more slots is unavailable for communication with the UE, and communicate with the UE using the determined remaining portion of the full duplex communication resources in the one or more slots based on transmitting the pre-emption indication.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting pre-emption indication for full duplex communications).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
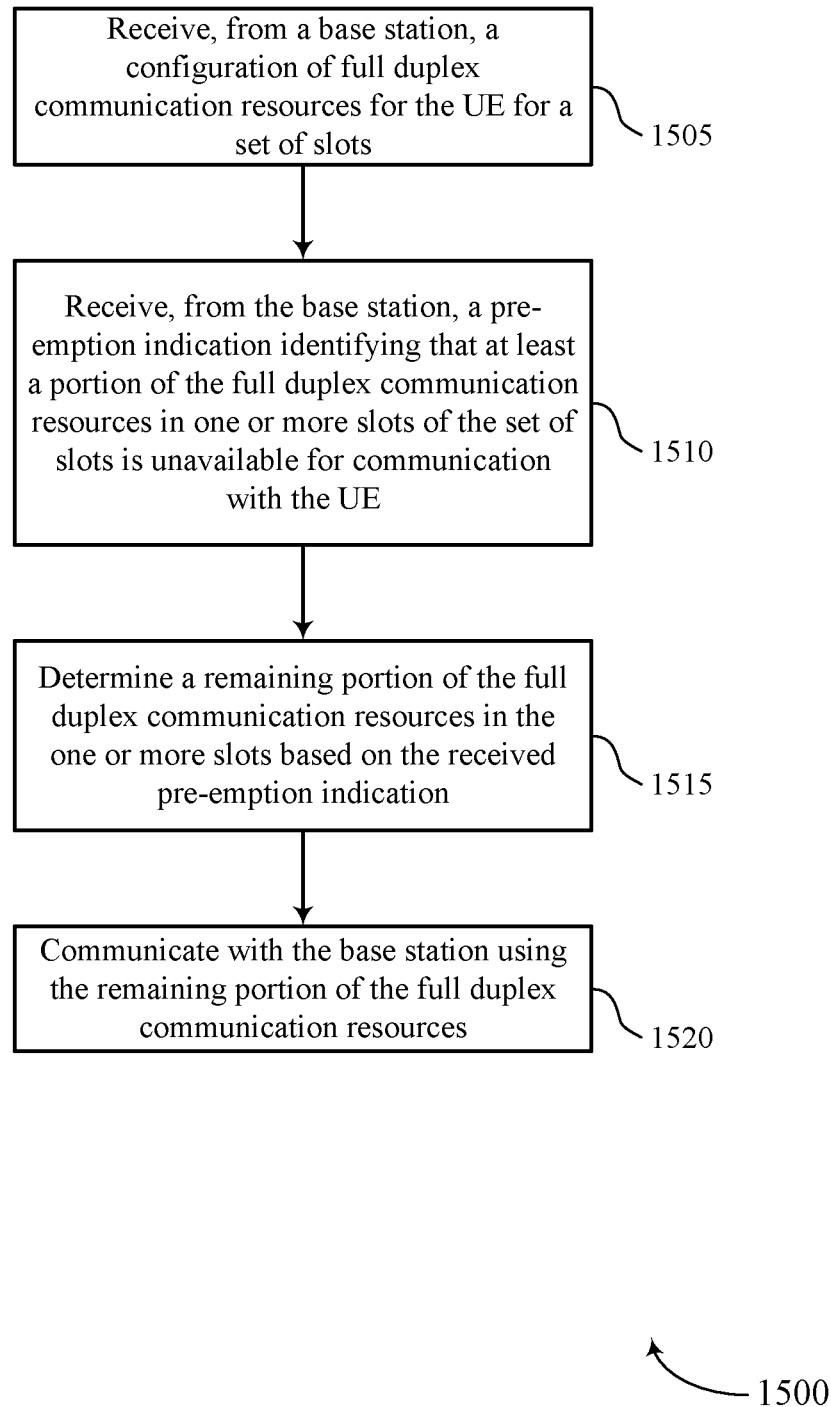
FIGS. 15 through 18 show flowcharts illustrating methods that support pre-emption indication for full duplex communications in accordance with aspects of the present disclosure.

FIG. 15 shows a flowchart illustrating a method 1500 that supports pre-emption indication for full duplex communications in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a base station, a configuration of full duplex communication resources for the UE for a set of slots. The operations of 1505 may be performed according to the methods described herein. In some examples, aspects of the operations of 1505 may be performed by a configuration component as described with reference to FIGS. 7 through 10.

At 1510, the UE may receive, from the base station, a pre-emption indication identifying that at least a portion of the full duplex communication resources in one or more slots of the set of slots is unavailable for communication with the UE. The operations of 1510 may be performed according to the methods described herein. In some examples, aspects of the operations of 1510 may be performed by a pre-emption indication component as described with reference to FIGS. 7 through 10.

At 1515, the UE may determine a remaining portion of the full duplex communication resources in the one or more slots based on the received pre-emption indication. The operations of 1515 may be performed according to the methods described herein. In some examples, aspects of the operations of 1515 may be performed by a resource determination component as described with reference to FIGS. 7 through 10.

At 1520, the UE may communicate with the base station using the remaining portion of the full duplex communication resources. The operations of 1520 may be performed according to the methods described herein. In some examples, aspects of the operations of 1520 may be performed by a communication component as described with reference to FIGS. 7 through 10.

Figure 16:
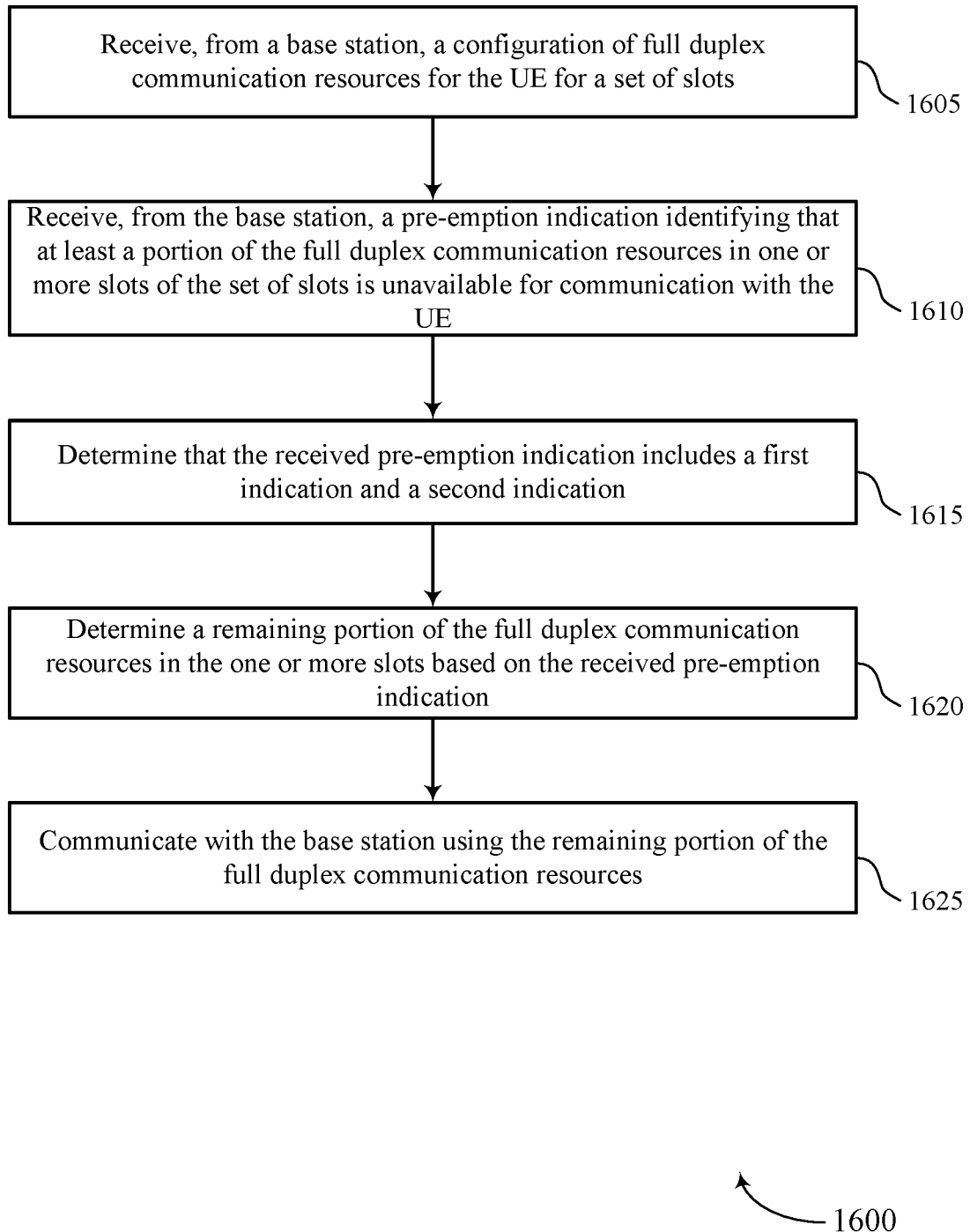

FIG. 16 shows a flowchart illustrating a method 1600 that supports pre-emption indication for full duplex communications in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1605, the UE may receive, from a base station, a configuration of full duplex communication resources for the UE for a set of slots. The operations of 1605 may be performed according to the methods described herein. In some examples, aspects of the operations of 1605 may be performed by a configuration component as described with reference to FIGS. 7 through 10.

At 1610, the UE may receive, from the base station, a pre-emption indication identifying that at least a portion of the full duplex communication resources in one or more slots of the set of slots is unavailable for communication with the UE. The operations of 1610 may be performed according to the methods described herein. In some examples, aspects of the operations of 1610 may be performed by a pre-emption indication component as described with reference to FIGS. 7 through 10.

At 1615, the UE may determine that the received pre-emption indication includes a first indication and a second indication, the first indication identifying that at least a portion of downlink communication resources in the one or more slots is unavailable for communication with the UE, and the second indication identifying that at least a portion of uplink communication resources in the one or more slots is unavailable for communication with the UE, where determining the remaining portion of the full duplex communication resources is based on the first indication and the second indication. The operations of 1615 may be performed according to the methods described herein. In some examples, aspects of the operations of 1615 may be performed by a pre-emption indication component as described with reference to FIGS. 7 through 10.

At 1620, the UE may determine a remaining portion of the full duplex communication resources in the one or more slots based on the received pre-emption indication. The operations of 1620 may be performed according to the methods described herein. In some examples, aspects of the operations of 1620 may be performed by a resource determination component as described with reference to FIGS. 7 through 10.

At 1625, the UE may communicate with the base station using the remaining portion of the full duplex communication resources. The operations of 1625 may be performed according to the methods described herein. In some examples, aspects of the operations of 1625 may be performed by a communication component as described with reference to FIGS. 7 through 10.

Figure 17:
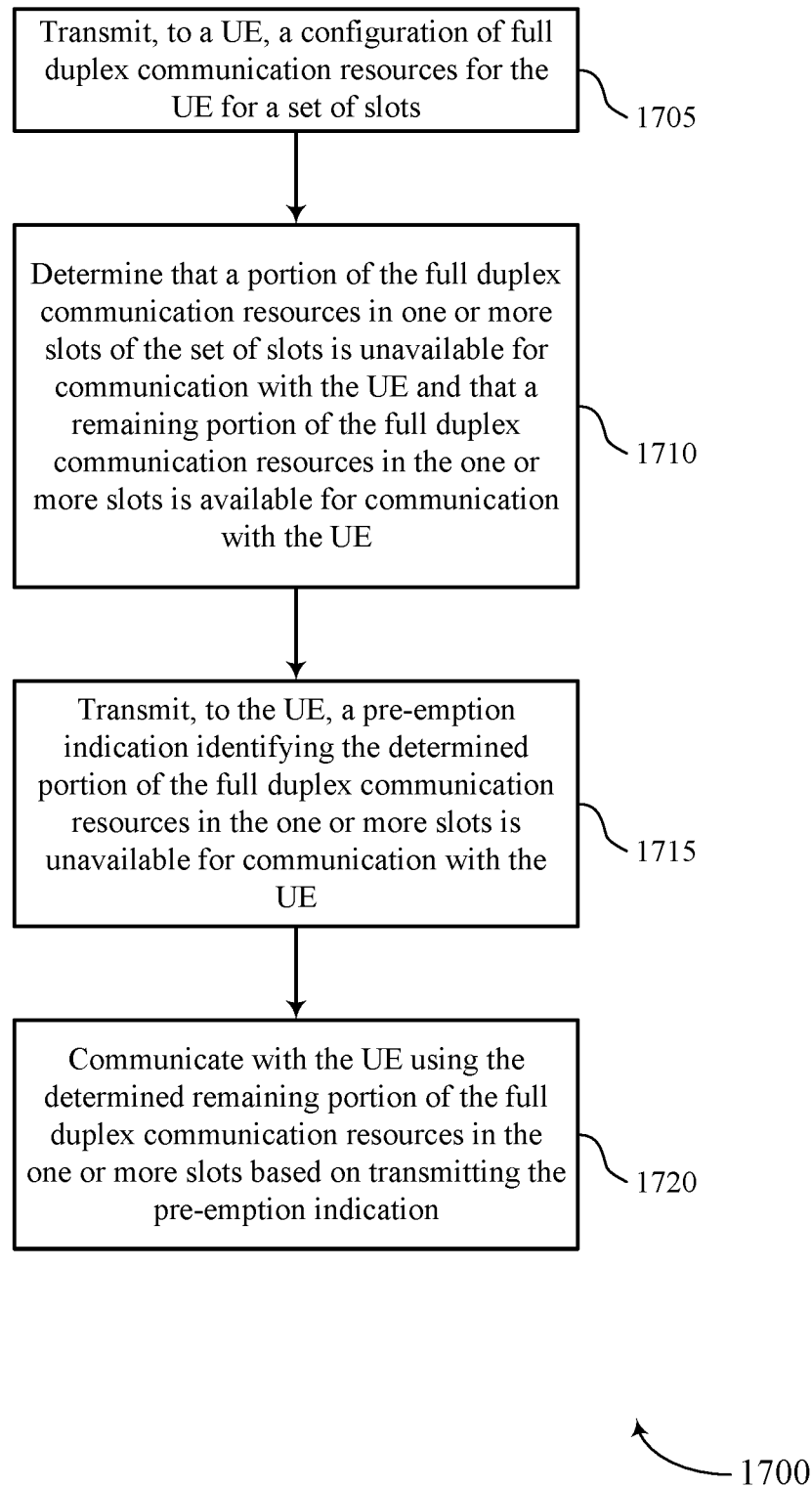

FIG. 17 shows a flowchart illustrating a method 1700 that supports pre-emption indication for full duplex communications in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1705, the base station may transmit, to a UE, a configuration of full duplex communication resources for the UE for a set of slots. The operations of 1705 may be performed according to the methods described herein. In some examples, aspects of the operations of 1705 may be performed by a configuration component as described with reference to FIGS. 11 through 14.

At 1710, the base station may determine that a portion of the full duplex communication resources in one or more slots of the set of slots is unavailable for communication with the UE and that a remaining portion of the full duplex communication resources in the one or more slots is available for communication with the UE. The operations of 1710 may be performed according to the methods described herein. In some examples, aspects of the operations of 1710 may be performed by a resource determination component as described with reference to FIGS. 11 through 14.

At 1715, the base station may transmit, to the UE, a pre-emption indication identifying the determined portion of the full duplex communication resources in the one or more slots is unavailable for communication with the UE. The operations of 1715 may be performed according to the methods described herein. In some examples, aspects of the operations of 1715 may be performed by a pre-emption indication component as described with reference to FIGS. 11 through 14.

At 1720, the base station may communicate with the UE using the determined remaining portion of the full duplex communication resources in the one or more slots based on transmitting the pre-emption indication. The operations of 1720 may be performed according to the methods described herein. In some examples, aspects of the operations of 1720 may be performed by a communication component as described with reference to FIGS. 11 through 14.

Figure 18:
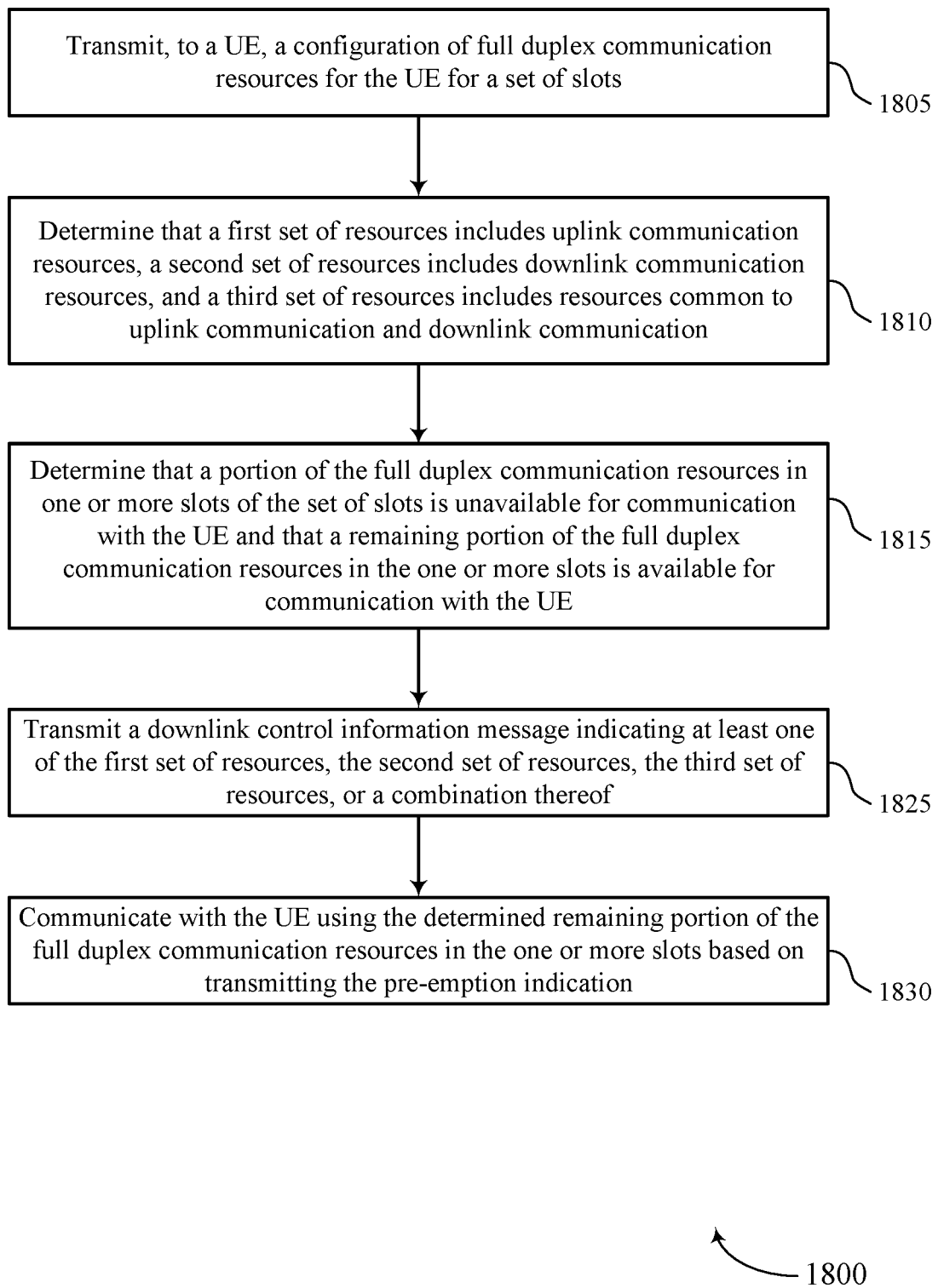

FIG. 18 shows a flowchart illustrating a method 1800 that supports pre-emption indication for full duplex communications in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1805, the base station may transmit, to a UE, a configuration of full duplex communication resources for the UE for a set of slots. The operations of 1805 may be performed according to the methods described herein. In some examples, aspects of the operations of 1805 may be performed by a configuration component as described with reference to FIGS. 11 through 14.

At 1810, the base station may determine that a portion of the full duplex communication resources in one or more slots of the set of slots is unavailable for communication with the UE and that a remaining portion of the full duplex communication resources in the one or more slots is available for communication with the UE. The operations of 1810 may be performed according to the methods described herein. In some examples, aspects of the operations of 1810 may be performed by a resource determination component as described with reference to FIGS. 11 through 14.

At 1815, the base station may transmit, to the UE, a pre-emption indication identifying the determined portion of the full duplex communication resources in the one or more slots is unavailable for communication with the UE. The operations of 1815 may be performed according to the methods described herein. In some examples, aspects of the operations of 1815 may be performed by a pre-emption indication component as described with reference to FIGS. 11 through 14.

At 1820, the base station may determine that a first set of resources includes uplink communication resources, a second set of resources includes downlink communication resources, and a third set of resources includes resources common to uplink communication and downlink communication, where the remaining portion of the full duplex communication resources is based on the first set of resources, the second set of resources and the third set of resources. The operations of 1820 may be performed according to the methods described herein. In some examples, aspects of the operations of 1820 may be performed by a resource determination component as described with reference to FIGS. 11 through 14.

At 1825, the base station may transmit a downlink control information message indicating at least one of the first set of resources, the second set of resources, the third set of resources, or a combination thereof. The operations of 1825 may be performed according to the methods described herein. In some examples, aspects of the operations of 1825 may be performed by a pre-emption indication component as described with reference to FIGS. 11 through 14.

At 1830, the base station may communicate with the UE using the determined remaining portion of the full duplex communication resources in the one or more slots based on transmitting the pre-emption indication. The operations of 1830 may be performed according to the methods described herein. In some examples, aspects of the operations of 1830 may be performed by a communication component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving, from a base station, a configuration of full duplex communication resources for the UE for a plurality of slots; receiving, from the base station, a pre-emption indication identifying that at least a portion of the full duplex communication resources in one or more slots of the plurality of slots is unavailable for communication with the UE; and communicating with the base station using a remaining portion of the full duplex communication resources in the one or more slots, the remaining portion based at least in part on the received pre-emption indication.

Aspect 2: The method of aspect 1, further comprising: determining that the received pre-emption indication identifies that at least a portion of downlink communication resources and at least a portion of uplink communication resources in the one or more slots is unavailable for communication with the UE, wherein the received pre-emption indication comprises a downlink pre-emption indication or an uplink pre-emption indication.

Aspect 3: The method of any of aspects 1 through 2, further comprising: determining that the received pre-emption indication comprises a first indication and a second indication, the first indication identifying that at least a portion of downlink communication resources in the one or more slots is unavailable for communication with the UE, and the second indication identifying that at least a portion of uplink communication resources in the one or more slots is unavailable for communication with the UE, wherein determining the remaining portion of the full duplex communication resources is based at least in part on the first indication and the second indication.

Aspect 4: The method of aspect 3, wherein receiving the pre-emption indication comprises: receiving the first indication and the second indication via a downlink control information message.

Aspect 5: The method of any of aspects 1 through 4, further comprising: receiving a downlink control information message from the base station; and determining that the portion of the full duplex communication resources in the one or more slots comprises downlink communication resources based at least in part on the received downlink control information message.

Aspect 6: The method of any of aspects 1 through 5, further comprising: receiving a downlink control information message from the base station; and determining that the portion of the full duplex communication resources in the one or more slots comprises uplink communication resources based at least in part on the received downlink control information message.

Aspect 7: The method of any of aspects 1 through 6, wherein determining the remaining portion of the full duplex communication resources is further based at least in part on determining that the portion of the full duplex communication resources in the one or more slots comprises uplink communication resources or downlink communication resources, or both.

Aspect 8: The method of any of aspects 1 through 7, wherein receiving the pre-emption indication comprises: receiving, from the base station, a downlink control information message indicating at least one of a first set of resources, a second set of resources, a third set of resources, or a combination thereof.

Aspect 9: The method of aspect 8, wherein the first set of resources comprises uplink communication resources, the second set of resources comprises downlink communication resources, and the third set of resources comprises resources common to uplink communication and downlink communication, and determining the remaining portion of the full duplex communication resources is based at least in part on the first set of resources, the second set of resources, and the third set of resources.

Aspect 10: The method of any of aspects 1 through 9, further comprising: determining that a first subset of the portion of the full duplex communication resources in the one or more slots comprises downlink communication resources based at least in part on the received pre-emption indication; and determining that a second subset of the portion of the full duplex communication resources in the one or more slots comprises uplink communication resources based at least in part on the received pre-emption indication.

Aspect 11: The method of any of aspects 1 through 10, further comprising: determining that the pre-emption indication is absent based at least in part on determining that the plurality of slots is less than a threshold number of slots.

Aspect 12: The method of any of aspects 1 through 11, further comprising: receiving, from the base station, one of a downlink pre-emption indication or an uplink pre-emption indication, the downlink pre-emption indication identifying that a portion of downlink communication resources in the one or more slots is unavailable for communication with the UE, and the uplink pre-emption indication identifying that a portion of uplink communication resources in the one or more slots is unavailable for communication with the UE; and determining the remaining portion of the full duplex communication resources in the one or more slots based at least in part on the received pre-emption indication and the one of the downlink pre-emption indication or the uplink pre-emption indication.

Aspect 13: The method of any of aspects 1 through 12, further comprising: receiving, from the base station, one of a downlink pre-emption indication or an uplink pre-emption indication, the downlink pre-emption indication identifying that a portion of downlink communication resources in the one or more slots is unavailable for communication with the UE, and the uplink pre-emption indication identifying that a portion of uplink communication resources in the one or more slots is unavailable for communication with the UE; and assuming that the downlink pre-emption indication is absent based at least in part on the received pre-emption indication and the one of the downlink pre-emption indication or the uplink pre-emption indication.

Aspect 14: The method of any of aspects 1 through 13, wherein a periodicity of the pre-emption indication corresponds to a periodicity of the plurality of slots.

Aspect 15: The method of any of aspects 1 through 14, wherein the pre-emption indication is included in at least a sequence, a physical downlink control channel, or a combination thereof.

Aspect 16: The method of any of aspects 1 through 15, wherein the portion of the full duplex communication resources in the one or more slots are indicated via at least one of a bitmap, a start indicator, a length indicator, or a combination thereof.

Aspect 17: The method of any of aspects 1 through 16, wherein a difference between a timing associated with receiving the pre-emption indication and a timing associated with uplink communication resources included in the portion of the full duplex communication resources in the one or more slots satisfies a threshold.

Aspect 18: A method for wireless communication at a base station, comprising: transmitting, to a UE, a configuration of full duplex communication resources for the UE for a plurality of slots; transmitting, to the UE, a pre-emption indication identifying that a portion of the full duplex communication resources in one or more slots is unavailable for communication with the UE, wherein a remaining portion of the full duplex communication resources in the one or more slots is available for communication with the UE; and communicating with the UE using the determined remaining portion of the full duplex communication resources in the one or more slots based at least in part on transmitting the pre-emption indication.

Aspect 19: The method of aspect 18, wherein transmitting the pre-emption indication comprises: transmitting a first indication identifying that at least a portion of downlink communication resources in the one or more slots is unavailable for communication with the UE; and transmitting a second indication identifying that at least a portion of uplink communication resources in the one or more slots is unavailable for communication with the UE, wherein the remaining portion of the full duplex communication resources is based at least in part on the first indication and the second indication.

Aspect 20: The method of aspect 19, wherein transmitting the pre-emption indication further comprises: transmitting the first indication and the second indication via a downlink control information.

Aspect 21: The method of any of aspects 18 through 20, further comprising: determining that the portion of the full duplex communication resources in the one or more slots comprises downlink communication resources; and transmitting, to a UE, a downlink control information message identifying the downlink communication resources.

Aspect 22: The method of any of aspects 18 through 21, further comprising: determining that the portion of the full duplex communication resources in the one or more slots comprises uplink communication resources; and transmitting, to a UE, a downlink control information message identifying the uplink communication resources.

Aspect 23: The method of any of aspects 18 through 22, wherein transmitting the pre-emption information comprises: determining that a first set of resources comprises uplink communication resources, a second set of resources comprises downlink communication resources, and a third set of resources comprises resources common to uplink communication and downlink communication, wherein the remaining portion of the full duplex communication resources is based at least in part on the first set of resources, the second set of resources and the third set of resources; and transmitting a downlink control information message indicating at least one of the first set of resources, the second set of resources, the third set of resources, or a combination thereof.

Aspect 24: An apparatus for wireless communication at a UE, comprising a processor; memory coupled with the processor; and instructions stored in the memory and executable by the processor to cause the apparatus to perform a method of any of aspects 1 through 17.

Aspect 25: An apparatus for wireless communication at a UE, comprising at least one means for performing a method of any of aspects 1 through 17.

Aspect 26: A non-transitory computer-readable medium storing code for wireless communication at a UE, the code comprising instructions executable by a processor to perform a method of any of aspects 1 through 17.

Aspect 27: An apparatus for wireless communication at a base station, comprising a processor; memory coupled with the processor; and instructions stored in the memory and executable by the processor to cause the apparatus to perform a method of any of aspects 18 through 23.

Aspect 28: An apparatus for wireless communication at a base station, comprising at least one means for performing a method of any of aspects 18 through 23.

Aspect 29: A non-transitory computer-readable medium storing code for wireless communication at a base station, the code comprising instructions executable by a processor to perform a method of any of aspects 18 through 23.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station, a configuration of full duplex communication resources for the UE for a plurality of slots;
   receiving, from the base station, a pre-emption indication identifying that at least a portion of the full duplex communication resources in one or more slots of the plurality of slots is unavailable for communication;
   determining based on the received pre-emption indication that at least a portion of downlink communication resources and at least a portion of uplink communication resources in the one or more slots are unavailable for communication; and
   communicating with the base station using a remaining portion of the full duplex communication resources in the one or more slots, the remaining portion based at least in part on the received pre-emption indication.

2. The method of claim 1, further comprising:
   determining that the received pre-emption indication comprises a first indication and a second indication, the first indication identifying that at least the portion of downlink communication resources in the one or more slots is unavailable for communication, and the second indication identifying that at least the portion of uplink communication resources in the one or more slots is unavailable for communication, wherein the remaining portion of the full duplex communication resources is determined based at least in part on the first indication and the second indication.

3. The method of claim 2, wherein receiving the pre-emption indication comprises:
   receiving the first indication and the second indication via a downlink control information message.

4. The method of claim 1, further comprising:
   receiving a downlink control information message from the base station; and
   determining that the portion of the full duplex communication resources in the one or more slots comprises downlink communication resources based at least in part on the received downlink control information message.

5. The method of claim 1, further comprising:
   receiving a downlink control information message from the base station; and
   determining that the portion of the full duplex communication resources in the one or more slots comprises uplink communication resources based at least in part on the received downlink control information message.

6. The method of claim 1, wherein:
   determining the remaining portion of the full duplex communication resources is further based at least in part on determining that the portion of the full duplex communication resources in the one or more slots comprises uplink communication resources or downlink communication resources, or both.

7. The method of claim 1, wherein receiving the pre-emption indication comprises receiving, from the base station, a downlink control information message indicating at least one of a first set of resources, a second set of resources, a third set of resources, or a combination thereof, and wherein the first set of resources comprises uplink communication resources, the second set of resources comprises downlink communication resources, and the third set of resources comprises resources common to uplink communication and downlink communication, and wherein determining the remaining portion of the full duplex communication resources is based at least in part on the first set of resources, the second set of resources, and the third set of resources.

8. The method of claim 1, further comprising:
   determining that a first subset of the portion of the full duplex communication resources in the one or more slots comprises downlink communication resources based at least in part on the received pre-emption indication; and
   determining that a second subset of the portion of the full duplex communication resources in the one or more slots comprises uplink communication resources based at least in part on the received pre-emption indication.

9. The method of claim 1, further comprising:
   determining that the pre-emption indication is absent based at least in part on determining that the plurality of slots is less than a threshold number of slots.

10. The method of claim 1, further comprising:
    receiving, from the base station, one of a downlink pre-emption indication or an uplink pre-emption indication, the downlink pre-emption indication identifying that a portion of downlink communication resources in the one or more slots is unavailable for communication, and the uplink pre-emption indication identifying that a portion of uplink communication resources in the one or more slots is unavailable for communication; and
    determining the remaining portion of the full duplex communication resources in the one or more slots based at least in part on the received pre-emption indication and the one of the downlink pre-emption indication or the uplink pre-emption indication.

11. The method of claim 1, further comprising:
    receiving, from the base station, one of a downlink pre-emption indication or an uplink pre-emption indication, the downlink pre-emption indication identifying that a portion of downlink communication resources in the one or more slots is unavailable for communication, and the uplink pre-emption indication identifying that a portion of uplink communication resources in the one or more slots is unavailable for communication; and
    assuming that the downlink pre-emption indication is absent based at least in part on the received pre-emption indication and the one of the downlink pre-emption indication or the uplink pre-emption indication.

12. The method of claim 1, wherein a periodicity of the pre-emption indication corresponds to a periodicity of the plurality of slots.

13. The method of claim 1, wherein the pre-emption indication is included in at least a sequence, a physical downlink control channel, or a combination thereof.

14. The method of claim 1, wherein the portion of the full duplex communication resources in the one or more slots are indicated via at least one of a bitmap, a start indicator, a length indicator, or a combination thereof.

15. The method of claim 1, wherein a difference between a timing associated with receiving the pre-emption indication and a timing associated with uplink communication resources included in the portion of the full duplex communication resources in the one or more slots satisfies a threshold.

16. The method of claim 1, wherein the received pre-emption indication comprises a downlink pre-emption indication, the method further comprising interpreting the downlink pre-emption indication as an uplink pre-emption indication based on downlink and uplink full duplex communications using a same portion of resources.

17. The method of claim 1, wherein the received pre-emption indication comprises an uplink pre-emption indication, the method further comprising interpreting the uplink pre-emption indication as a downlink pre-emption indication based on downlink and uplink full duplex communications using a same portion of resources.

18. The method of claim 1, wherein the configuration of full duplex communication resources configures uplink resources and downlink resources where the UE is configured to simultaneously transmit on at least some of the uplink resources and receive on at least some of the downlink resources, the method further comprising:
  interpreting the pre-emption indication as an uplink pre-emption indication for the full duplex communication resources identified by the pre-emption indication which are included in the uplink resources; and
  interpreting the pre-emption indication as a downlink pre-emption indication for the full duplex communication resources identified by the pre-emption indication which are included in the downlink resources.

19. A method for wireless communication at a base station, comprising:
  transmitting, to a user equipment (UE), a configuration of full duplex communication resources for the UE for a plurality of slots;
  transmitting, to the UE, a pre-emption indication identifying that a portion of the full duplex communication resources in one or more slots is unavailable for communication with the UE, wherein a remaining portion of the full duplex communication resources in the one or more slots is available for communication with the UE, wherein transmitting the pre-emption indication comprises:
    transmitting a first indication identifying that at least a portion of downlink communication resources in the one or more slots is unavailable for communication with the UE; and
    transmitting a second indication identifying that at least a portion of uplink communication resources in the one or more slots is unavailable for communication with the UE, wherein the remaining portion of the full duplex communication resources is based at least in part on the first indication and the second indication; and
  communicating with the UE using the remaining portion of the full duplex communication resources in the one or more slots based at least in part on transmitting the pre-emption indication.

20. The method of claim 19, further comprising:
  determining that the portion of the full duplex communication resources in the one or more slots comprises downlink communication resources; and
  transmitting, to a UE, a downlink control information message identifying the downlink communication resources.

21. The method of claim 19, further comprising:
  determining that the portion of the full duplex communication resources in the one or more slots comprises uplink communication resources; and
  transmitting, to a UE, a downlink control information message identifying the uplink communication resources.

22. The method of claim 19, wherein transmitting the pre-emption indication comprises:
  determining that a first set of resources comprises uplink communication resources, a second set of resources comprises downlink communication resources, and a third set of resources comprises resources common to uplink communication and downlink communication, wherein the remaining portion of the full duplex communication resources is based at least in part on the first set of resources, the second set of resources and the third set of resources; and
  transmitting a downlink control information message indicating at least one of the first set of resources, the second set of resources, the third set of resources, or a combination thereof.

23. An apparatus for wireless communication at a user equipment (UE), comprising:
  one or more processors,
  memory coupled with the one or more processors; and
  instructions stored in the memory and executable by the one or more processors to cause the UE to:
  receive, from a base station, a configuration of full duplex communication resources for the UE for a plurality of slots;
  receive, from the base station, a pre-emption indication identifying that at least a portion of the full duplex communication resources in one or more slots of the plurality of slots is unavailable for communication;
  determine based on the received pre-emption indication that at least a portion of downlink communication resources and at least a portion of uplink communication resources in the one or more slots are unavailable for communication; and
  communicate with the base station using a remaining portion of the full duplex communication resources in the one or more slots, the remaining portion based at least in part on the received pre-emption indication.

24. The apparatus of claim 23, wherein the instructions are further executable by the one or more processors to cause the UE to:
  determine that the received pre-emption indication comprises a first indication and a second indication, the first indication identifying that at least the portion of downlink communication resources in the one or more slots is unavailable for communication, and the second indication identifying that at least the portion of uplink communication resources in the one or more slots is unavailable for communication, wherein the remaining portion of the full duplex communication resources is determined based at least in part on the first indication and the second indication.

25. The apparatus of claim 24 wherein the instructions are further executable by the one or more processors to cause the UE to:
  receive the first indication and the second indication via a downlink control information message.

26. The apparatus of claim 23, wherein the instructions are further executable by the one or more processors to cause the UE to:
  receive a downlink control information message from the base station; and
  determine that the portion of the full duplex communication resources in the one or more slots comprises downlink communication resources based at least in part on the received downlink control information message.

27. The apparatus of claim 23, wherein the received pre-emption indication comprises a downlink pre-emption indication, and wherein the instructions are further executable by the one or more processors to cause the UE to interpret the downlink pre-emption indication as an uplink pre-emption indication based on downlink and uplink full duplex communications using a same portion of resources.

28. The apparatus of claim 23, wherein the received pre-emption indication comprises an uplink pre-emption indication, wherein the instructions are further executable by the one or more processors to cause the UE to interpret the uplink pre-emption indication as a downlink pre-emption indication based on downlink and uplink full duplex communications using a same portion of resources.

29. The apparatus of claim 23, wherein the configuration of full duplex communication resources configures uplink resources and downlink resources where the UE is configured to simultaneously transmit on at least some of the uplink resources and receive on at least some of the downlink resources, wherein the instructions are further executable by the one or more processors to cause the UE to:
  interpret the pre-emption indication as an uplink pre-emption indication for the full duplex communication resources identified by the pre-emption indication which are included in the uplink resources; and
  interpret the pre-emption indication as a downlink pre-emption indication for the full duplex communication resources identified by the pre-emption indication which are included in the downlink resources.

30. An apparatus for wireless communication at a base station, comprising:
  one or more processors,
  memory coupled with the one or more processors; and
  instructions stored in the memory and executable by the one or more processors to cause the base station to:
  transmit, to a user equipment (UE), a configuration of full duplex communication resources for the UE for a plurality of slots;
  transmit, to the UE, a pre-emption indication identifying that a portion of the full duplex communication resources in one or more slots is unavailable for communication with the UE, wherein a remaining portion of the full duplex communication resources in the one or more slots is available for communication with the UE, wherein the one or more processors are configured to cause the base station to transmit the pre-emption indication by being configured to:
    transmit a first indication identifying that at least a portion of downlink communication resources in the one or more slots is unavailable for communication with the UE; and
    transmit a second indication identifying that at least a portion of uplink communication resources in the one or more slots is unavailable for communication with the UE, wherein the remaining portion of the full duplex communication resources is based at least in part on the first indication and the second indication; and
  communicate with the UE using the remaining portion of the full duplex communication resources in the one or more slots based at least in part on transmission of the pre-emption indication.

* * * * *